United States Patent
Kobayashi

(10) Patent No.: US 11,879,504 B1
(45) Date of Patent: Jan. 23, 2024

(54) CLUTCH DEVICE AND MOTORCYCLE

(71) Applicant: Kabushiki Kaisha F.C.C., Hamamatsu (JP)

(72) Inventor: Yuki Kobayashi, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 18/214,625

(22) Filed: Jun. 27, 2023

(30) Foreign Application Priority Data

Jun. 30, 2022 (JP) ................... 2022-106532

(51) Int. Cl.
  *F16D 13/54* (2006.01)
  *F16D 13/74* (2006.01)
  *F16D 13/04* (2006.01)
  *F16D 13/56* (2006.01)

(52) U.S. Cl.
  CPC ............ *F16D 13/54* (2013.01); *F16D 13/04* (2013.01); *F16D 13/74* (2013.01); *F16D 2013/565* (2013.01)

(58) Field of Classification Search
  CPC .......... F16D 13/04; F16D 13/52; F16D 13/54; F16D 13/56; F16D 2013/565; F16D 13/74
  See application file for complete search history.

(56) References Cited

U.S. PATENT DOCUMENTS

| | | | |
|---|---|---|---|
| 2019/0285122 A1* | 9/2019 | Imanishi | F16D 13/54 |
| 2020/0292010 A1 | 9/2020 | Kobayashi et al. | |
| 2020/0318694 A1 | 10/2020 | Morone et al. | |
| 2020/0340536 A1 | 10/2020 | Nishikawa et al. | |
| 2021/0033154 A1* | 2/2021 | Isobe | F16D 13/54 |

FOREIGN PATENT DOCUMENTS

| | | |
|---|---|---|
| EP | 3 998 412 A1 | 5/2022 |
| JP | 10-169668 A | 6/1998 |
| JP | 6903020 B2 | 7/2021 |
| JP | 2022-072810 A | 5/2022 |
| WO | 2019/082597 A1 | 5/2019 |
| WO | 2019/163763 A1 | 8/2019 |

OTHER PUBLICATIONS

Official Communication issued in Japanese Patent Application No. 2022-106532, dated Sep. 27, 2022.
Official Communication issued in Japanese Patent Application No. 2022-106532, dated Feb. 7, 2023.
Official Communication issued in International Search Report No. PCT/JP2023/016508, dated Jul. 11, 2023.

* cited by examiner

*Primary Examiner* — Richard M Lorence
(74) *Attorney, Agent, or Firm* — Keating & Bennett, LLP

(57) ABSTRACT

A clutch device includes a pressure plate movable toward and away from a clutch center to press input-side rotating plates and output-side rotating plates. An oil flow hole is located in a spline groove to penetrate an outer peripheral wall of the clutch center, to enable clutch oil having flowed out of an output shaft to be discharged to outside of the clutch center, and located between an end of a center-side slipper cam surface in a second circumferential direction and a center-side cam hole located ahead, in the first circumferential direction, of the end in the second circumferential direction, in the circumferential directions. A through hole is located ahead, in the first circumferential direction, of the end of the center-side slipper cam surface in the first circumferential to guide clutch oil flowing outside the clutch center to the inside of the clutch center.

12 Claims, 13 Drawing Sheets

CLUTCH DEVICE AND MOTORCYCLE

CROSS REFERENCE TO RELATED APPLICATIONS

This application claims the benefit of priority to Japanese Patent No. 2022-106532 filed on Jun. 30, 2022. The entire contents of this application are hereby incorporated herein by reference.

BACKGROUND OF THE INVENTION

1. Field of the Invention

The present disclosure relates to a clutch device and a motorcycle. More particularly, the present disclosure relates to a clutch device that arbitrarily allows or interrupts transfer of a rotation driving force of an input shaft that is rotationally driven by a prime mover such as an engine to an output shaft, and also relates to a motorcycle including the clutch device.

2. Description of the Related Art

Conventional vehicles such as motorcycles include clutch devices. A clutch device is disposed between an engine and a drive wheel and allows or interrupts transfer of a rotation driving force of the engine to the drive wheel. The clutch device generally includes a plurality of input-side rotating plates that rotate by a rotation driving force of an engine and a plurality of output-side rotating plates connected to an output shaft that transfers the rotation driving force to a drive wheel. The input-side rotating plates and the output-side rotating plates are alternately arranged in a stacking direction, and the input-side rotating plates and the output-side rotating plates are brought into pressure contact with each other and are separated from each other so that transfer of a rotation driving force is allowed or interrupted.

Japanese Patent No. 6903020, for example, discloses a clutch device including a clutch center (clutch member) that holds output-side rotating plates (driven-side clutch plates), and a pressure plate (pressure member) movable toward or away from the clutch center. The pressure plate is configured to press the input-side rotating plates and the output-side rotating plates. In this manner, the clutch device employs an assembly of the clutch center and the pressure plate.

In the clutch device of Japanese Patent No. 6903020, as portions holding the output-side rotating plates, the clutch center includes center-side fitting teeth (outer peripheral wall including splines), and the pressure plate includes pressure-side fitting teeth. In a state where the clutch center and the pressure plate are assembled, the center-side fitting teeth and the pressure-side fitting teeth overlap with each other in the radial direction.

Clutch oil that has flowed from the output shaft is distributed in the clutch center. The clutch oil is discharged to the outside of the clutch through an oil flow hole in the clutch center, and supplied to the output-side rotating plates held by the center-side fitting teeth and the input-side rotating plates located between the output-side rotating plates. Accordingly, it is desired that the clutch oil is efficiently discharged to the outside of the clutch center through the oil flow hole and supplied to the input-side rotating plates and the output-side rotating plates.

SUMMARY OF THE INVENTION

Preferred embodiments of the present disclosure provide clutch devices each capable of efficiently discharging clutch oil to outside of a clutch center through an oil flow hole of the clutch center and supplying the clutch oil to input-side rotating plates and output-side rotating plates, and motorcycles including such clutch devices.

A clutch device according to a preferred embodiment of the present disclosure is a clutch device that allows or interrupts transfer of a rotation driving force of an input shaft, and includes a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged, and a pressure plate movable toward or away from the clutch center and rotatable relative to the clutch center to press the input-side rotating plates and the output-side rotating plates. The clutch center includes an output shaft holding portion to which the output shaft is coupled, a plurality of center-side cam portions located radially outward of the output shaft holding portion and each including a center-side assist cam surface and a center-side slipper cam surface, the center-side assist cam surface being operable to generate a force in a direction from the pressure plate toward clutch center in order to increase a pressing force between the input-side rotating plates and the output-side rotating plates upon rotation relative to the pressure plate, the center-side slipper cam surface being operable to cause the pressure plate to move away from the clutch center to reduce the pressing force between the input-side rotating plates and the output-side rotating plates upon rotation relative to the pressure plate, a first through hole located between adjacent ones of the center-side cam portions, an outer peripheral wall located radially outward of the center-side cam portions, a plurality of center-side fitting teeth holding the output-side rotating plates, projecting radially outward from an outer peripheral surface of the outer peripheral wall, and arranged in circumferential directions, a plurality of spline grooves each located between adjacent ones of the center-side fitting teeth, and an oil flow hole located in the spline grooves to penetrate the outer peripheral wall to allow clutch oil flowing at an inner peripheral side of the outer peripheral wall to be discharged to outside of the clutch center. Assuming a direction in which the pressure plate approaches the clutch center is a first direction, a direction in which the pressure plate moves away from the clutch center is a second direction, a circumferential direction from one center-side cam portion to another center-side cam portion in the center-side cam portions is a first circumferential direction, and a circumferential direction from the another center-side cam portion to the one center-side cam portion is a second circumferential direction, the clutch center is rotatable in the first circumferential direction that is a direction from the center-side assist cam surface to the center-side slipper cam surface of one of the center-side cam portions, and includes a second through hole located ahead, in the first circumferential direction, of an end of the center-side slipper cam surface in the first circumferential direction in the circumferential directions, the oil flow hole is located between an end of the center-side slipper cam surface in the second circumferential direction and the first through hole located ahead, in the first circumferential direction, of the end in the second circumferential direction.

In a clutch device according to a preferred embodiment of the present disclosure, the clutch center is rotatable in the first circumferential direction that is a direction from the center-side assist cam surface toward the center-side slipper cam surface of one center-side cam portion. Thus, clutch oil in the clutch center is moved by a centrifugal force from the first through hole toward the center-side slipper cam surface along the outer peripheral wall. Here, in the circumferential directions, the oil flow hole is between the end of the center-side slipper cam surface in the second direction and the first through hole located ahead, in the first circumferential direction, of the end in the second direction. Thus, clutch oil in the clutch center can be efficiently discharged to the outside of the clutch center through the oil flow hole and supplied to the input-side rotating plates and the output-side rotating plates.

Another clutch device according to a preferred embodiment of present disclosure is a clutch device that allows or interrupts transfer of a rotation driving force of an input shaft to an output shaft, and includes a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged, and a pressure plate movable toward or away from the clutch center and rotatable relative to the clutch center to press the input-side rotating plates and the output-side rotating plates. The clutch center includes an output shaft holding portion to which the output shaft is coupled, a plurality of center-side cam portions located radially outward of the output shaft holding portion and each including a center-side assist cam surface to generate a force in a direction of causing the pressure plate to move toward or away from the clutch center in order to increase or reduce a pressing force between the input-side rotating plates and the output-side rotating plates upon rotation relative to the pressure plate, a first through hole located between adjacent ones of the center-side cam portions, an outer peripheral wall located radially outward of the center-side cam portions, a plurality of center-side fitting teeth holding the output-side rotating plates, projecting radially outward from an outer peripheral surface of the outer peripheral wall, and arranged in circumferential directions, a plurality of spline grooves each located between adjacent ones of the center-side fitting teeth, and an oil flow hole located in the spline grooves to penetrate the outer peripheral wall to allow clutch oil flowing at an inner peripheral side of the outer peripheral wall to be discharged to outside of the clutch center. Assuming a direction in which the pressure plate approaches the clutch center is a first direction, a direction in which the pressure plate moves away from the clutch center is a second direction, a circumferential direction from one center-side cam portion to another center-side cam portion in the center-side cam portions is a first circumferential direction, and a circumferential direction from the another center-side cam portion to the one center-side cam portion is a second circumferential direction, the clutch center is rotatable in the first circumferential direction with respect to the center-side cam surface in an end in one of the center-side cam portions in the first circumferential direction and facing in the second direction, and the oil flow hole is located between an end of the center-side cam surface in the second direction and the first through hole located ahead, in the first circumferential direction, of the end in the second direction.

In this clutch device according to a preferred embodiment of the present disclosure, the clutch center is rotatable in the first circumferential direction with respect to the center-side cam surface of one center-side cam portion. Thus, clutch oil in the clutch center is moved by a centrifugal force from the first through hole toward the center-side cam surface along the outer peripheral wall. In the circumferential directions, the oil flow hole is located between the end of the center-side cam surface in the second direction and the first through hole located ahead, in the first circumferential direction, of the end in the second direction. Thus, clutch oil in the clutch center can be efficiently discharged to the outside of the clutch center through the oil flow hole and supplied to the input-side rotating plates and the output-side rotating plates.

Another clutch device according to a preferred embodiment of the present disclosure is a clutch device that allows or interrupts transfer of a rotation driving force of an input shaft to an output shaft, and includes a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged, and a pressure plate movable toward or away from the clutch center and rotatable relative to the clutch center to press the input-side rotating plates and the output-side rotating plates. The clutch center includes an output shaft holding portion to which the output shaft is coupled, a plurality of center-side cam portions located radially outward of the output shaft holding portion and each including a center-side cam surface to generate a force in a direction of causing the pressure plate to move toward or away from the clutch center in order to increase or reduce a pressing force between the input-side rotating plates and the output-side rotating plates upon rotation relative to the pressure plate, a boss located radially outside of the output shaft holding portion and extending toward the pressure plate, an outer peripheral wall located radially outward of the center-side cam portions, a plurality of center-side fitting teeth holding the output-side rotating plates, projecting radially outward from an outer peripheral surface of the outer peripheral wall, and arranged in circumferential directions, a plurality of spline grooves each located between adjacent ones of the center-side fitting teeth, and an oil flow hole located in the spline grooves to penetrate the outer peripheral wall, allowing clutch oil flowing at an inner peripheral side of the outer peripheral wall to be discharged to outside of the clutch center. Assuming a direction in which the pressure plate approaches the clutch center is a first direction, a direction in which the pressure plate moves away from the clutch center is a second direction, a circumferential direction from one center-side cam portion to another center-side cam portion in the center-side cam portions is a first circumferential direction, and a circumferential direction from the another center-side cam portion to the one center-side cam portion is a second circumferential direction, the clutch center is rotatable in the first circumferential direction with respect to the center-side cam surface in an end of one of the center-side cam portions in the first circumferential direction and facing in the second direction, and in the circumferential directions, the oil flow hole is located between an end of the center-side cam surface in the second direction and the boss located ahead, in the first circumferential direction, of the end in the second direction.

In this clutch device according to a preferred embodiment of the present disclosure, the clutch center is rotatable in the first circumferential direction with respect to the center-side cam surface of one center-side cam portion. Thus, clutch oil in the clutch center is moved by a centrifugal force from the boss side toward the center-side cam surface (second circumferential direction S2) along the outer peripheral wall. In the circumferential directions, the oil flow hole is located between the end of the center-side cam surface in the second direction and the boss located ahead, in the first circumferential direction, of the end in the second direction. Thus, clutch oil in the clutch center can be efficiently discharged to the outside of the clutch center through the oil flow hole and supplied to the input-side rotating plates and the output-side rotating plates.

Preferred embodiments of the present invention provide clutch devices each capable of efficiently discharging clutch oil to outside of a clutch center from an oil flow hole of the clutch center and supplying the clutch oil to input-side rotating plates and output-side rotating plates.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
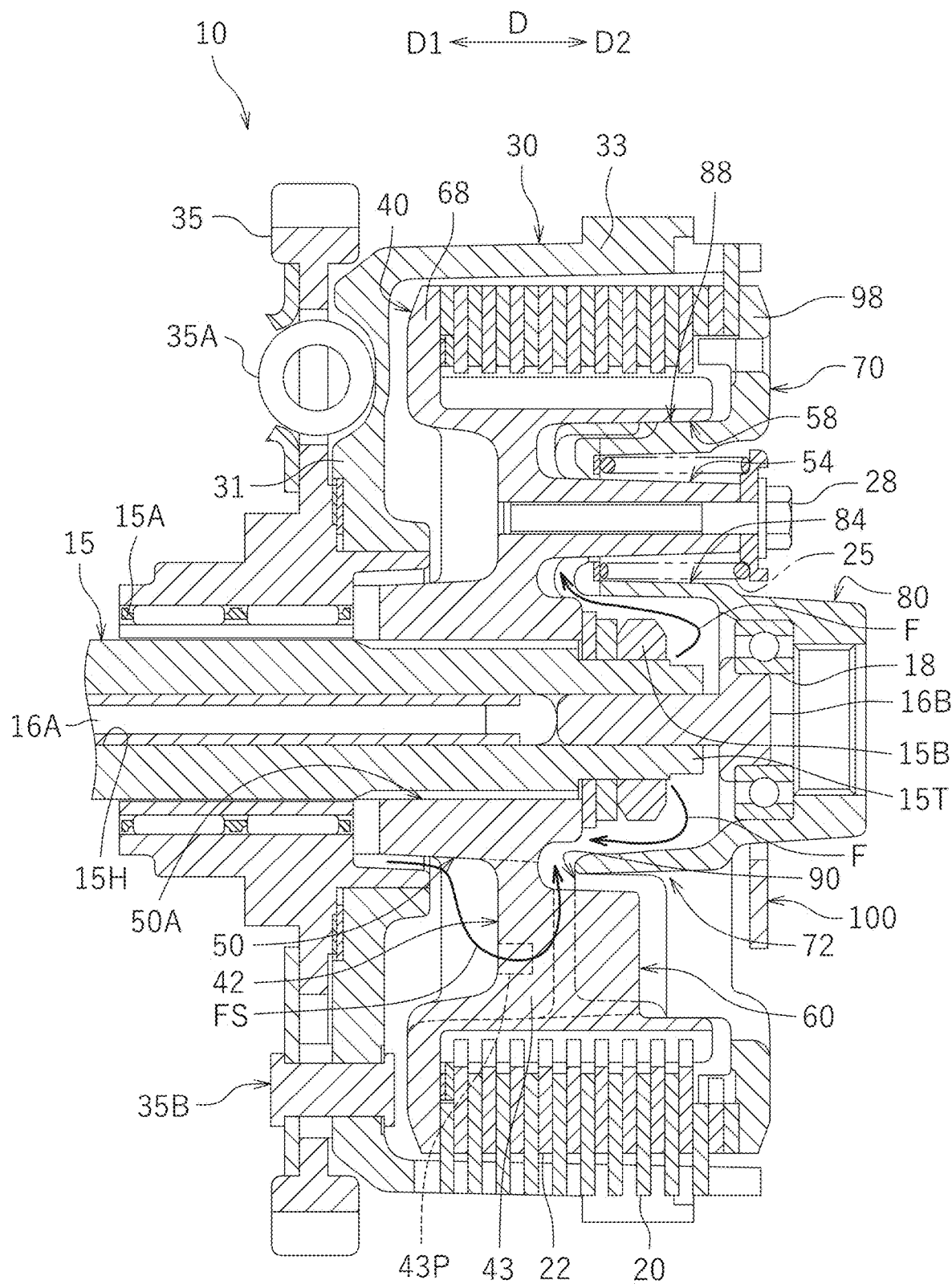
FIG. 1 is a cross-sectional view of a clutch device according to a first preferred embodiment of the present invention.

Clutch devices according to preferred embodiments of the present disclosure will be described hereinafter with reference to the drawings. The preferred embodiments described herein are, of course, not intended to particularly limit the present disclosure. Elements and features having the same functions are denoted by the same reference characters, and description for the same elements and features will not be repeated or will be simplified as appropriate.

First Preferred Embodiment

FIG. 1 is a cross-sectional view of a clutch device 10 according to this preferred embodiment. The clutch device 10 is provided in a vehicle such as a motorcycle, for example. The clutch device 10 allows or interrupts transfer of a rotation driving force of an input shaft (crankshaft) of an engine of the motorcycle to an output shaft 15, for example. The clutch device 10 allows or interrupts transfer of a rotation driving force of the input shaft to a drive wheel (rear wheel) through the output shaft 15. The clutch device 10 is disposed between the engine and a transmission.

In the following description, directions in which a pressure plate 70 of the clutch device 10 moves toward and away from the clutch center 40 will be referred to as directions D, a direction in which the pressure plate 70 moves toward the clutch center 40 will be referred to as a first direction D1, and a direction in which the pressure plate 70 moves away from the clutch center 40 will be referred to as a second direction D2. Circumferential directions of the clutch center 40 and the pressure plate 70 will be referred to as circumferential directions S, one of the circumferential direction S from one pressure-side cam portion 90 to another pressure-side cam portion 90 (direction from one center-side cam portion 60 to another center-side cam portion 60) will be referred to as a first circumferential direction S1 (see FIG. 5), and one of the circumferential direction S from the other pressure-side cam portion 90 to the one pressure-side cam portion 90 (direction from the other center-side cam portions 60 to the one center-side cam portions 60) will be referred to as a second circumferential direction S2 (see FIG. 5). In this preferred embodiment, axial directions of the output shaft 15, axial directions of a clutch housing 30, axial directions of the clutch center 40, and axial directions of the pressure plate 70 are the same as the directions D. The pressure plate 70 and the clutch center 40 rotate in the first circumferential direction S1 (i.e., direction from a center-side assist cam surface 60A to a center-side slipper cam surface 60S in one center-side cam portion 60). It should be noted that the directions described above are defined simply for convenience of description, and are not intended to limit the state of installation of the clutch device 10 and do not limit the present disclosure.

As illustrated in FIG. 1, the clutch device 10 includes the output shaft 15, input-side rotating plates 20, output-side rotating plates 22, the clutch housing 30, the clutch center 40, the pressure plate 70, and a stopper plate 100.

As illustrated in FIG. 1, the output shaft 15 is a hollow shaft. One end of the output shaft 15 rotatably supports an input gear 35 described later and the clutch housing 30 through a needle bearing 15A. The output shaft 15 fixedly supports a clutch center 40 through a nut 15B. That is, the output shaft 15 rotates together with the clutch center 40. The other end of the output shaft 15 is coupled to a transmission (not shown) of an automobile, for example.

As illustrated in FIG. 1, the output shaft 15 includes, in a hollow portion 15H thereof, a push rod 16A and a push member 16B adjacent to the push rod 16A. The hollow portion 15H serves as a channel of clutch oil. Clutch oil flows in the output shaft 15, that is, in the hollow portion 15H. The push rod 16A and the push member 16B are slidable in the hollow portion 15H of the output shaft 15. The push rod 16A has one end (left end in the drawing) coupled to a clutch operation lever (not shown) of the motorcycle, and slides in the hollow portion 15H by operation of the clutch operation lever and presses the clutch push member 16B in the second direction D2. A portion of the push member 16B projects outward of the output shaft 15 (in the second direction D2 in this preferred embodiment) and is coupled to a release bearing 18 provided on the pressure plate 70. The push rod 16A and the push member 16B are thinner than the inner diameter of the hollow portion 15H so that flowability of clutch oil is obtained in the hollow portion 15H.

The clutch housing 30 is made of an aluminum alloy. The clutch housing 30 has a bottomed cylindrical shape. As illustrated in FIG. 1, the clutch housing 30 includes a bottom wall 31 having a substantially circular shape, and a side wall 33 extending from an edge of the bottom wall 31 in the second direction D2. The clutch housing 30 holds the plurality of input-side rotating plates 20.

As illustrated in FIG. 1, an input gear 35 is disposed on the bottom wall 31 of the clutch housing 30. The input gear 35 is fixed to the bottom wall 31 by a rivet 35B through a torque damper 35A. The input gear 35 meshes with a driving gear (not shown) that rotates by rotational driving of the input shaft of the engine. The input gear 35 is rotationally driven together with the clutch housing 30, independently of the output shaft 15.

The input-side rotating plates 20 is rotationally driven by rotational driving of the input shaft. As illustrated in FIG. 1, the input-side rotating plates 20 are held on the inner peripheral surface of the side wall 33 of the clutch housing 30. The input-side rotating plates 20 are held in the clutch housing 30 by spline fitting. The input-side rotating plates 20 are displaceable along the axial direction of the clutch housing 30. The input-side rotating plates 20 are rotatable together with the clutch housing 30.

The input-side rotating plates 20 are pushed against the output-side rotating plates 22. The input-side rotating plates 20 are ring-shaped flat plates. Each of the input-side rotating plates 20 is shaped by punching a thin plate of a steel plate cold commercial (SPCC) material into a ring shape. Friction members (not shown) of a plurality of paper sheets are attached to the front and back surfaces of the input-side rotating plates 20. A groove with a depth of several micrometers to several tens of micrometers is formed between the friction members to hold clutch oil.

As illustrated in FIG. 1, the clutch center 40 is housed in the clutch housing 30. The clutch center 40 and the clutch housing 30 are concentrically disposed. The clutch center 40 includes a cylindrical body 42 and a flange 68 extending radially outward from the outer edge of the body 42. The clutch center 40 holds the plurality of output-side rotating plates 22 arranged alternately with the input-side rotating plates 20 in the directions D. The clutch center 40 is rotationally driven together with the output shaft 15.

Figure 2:
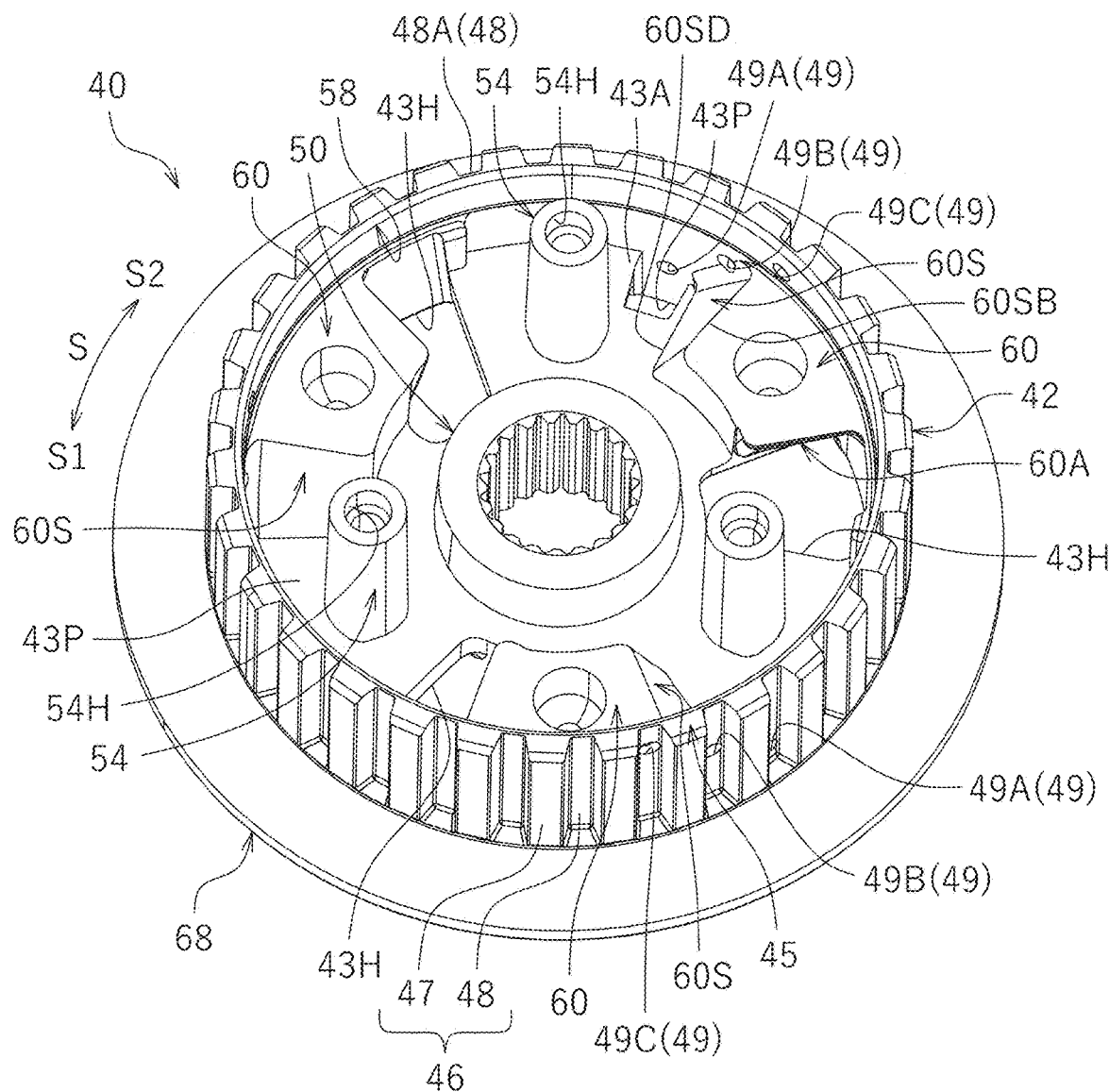
FIG. 2 is a perspective view of a clutch center according to the first preferred embodiment of the present invention.

As illustrated in FIG. 2, the body 42 includes a ring-shaped base wall 43, an outer peripheral wall 45 located radially outward of the base wall 43 and extending in the second direction D2, an output shaft holding portion 50 disposed at the center of the base wall 43, a plurality of center-side cam portions 60 connected to the base wall 43 and the outer peripheral wall 45, and a center-side fitting portion 58.

The output shaft holding portion 50 has a cylindrical shape. The output shaft holding portion 50 has an insertion hole 51 in which the output shaft 15 is inserted and spline-fitted. The insertion hole 51 penetrates the base wall 43. An inner peripheral surface 50A of the output shaft holding portion 50 defining the insertion hole 51 includes a plurality of spline grooves formed along the axial direction. The output shaft 15 is coupled to the output shaft holding portion 50.

As illustrated in FIG. 2, the outer peripheral wall 45 of the clutch center 40 is disposed radially outward of the output shaft holding portion 50. The outer peripheral wall 45 is located radially outward of the center-side cam portions 60. The outer peripheral surface of the outer peripheral wall 45 includes a spline fitting portion 46. The spline fitting portion 46 includes a plurality of center-side fitting teeth 47 extending in the axial directions of the clutch center 40 along the outer peripheral surface of the outer peripheral wall 45, a plurality of spline grooves 48 each formed between adjacent ones of the center-side fitting teeth 47 and extending in the axial directions of the clutch center 40, and oil flow holes 49. The center-side fitting teeth 47 hold the output-side rotating plates 22. The plurality of center-side fitting teeth 47 arranged in the circumferential directions S. The plurality of center-side fitting teeth 47 are arranged at regular or substantially regular intervals in the circumferential directions S. The plurality of center-side fitting teeth 47 have the same or substantially the same shape. The center-side fitting teeth 47 project radially outward from the outer peripheral surface of the outer peripheral wall 45.

Figure 12:
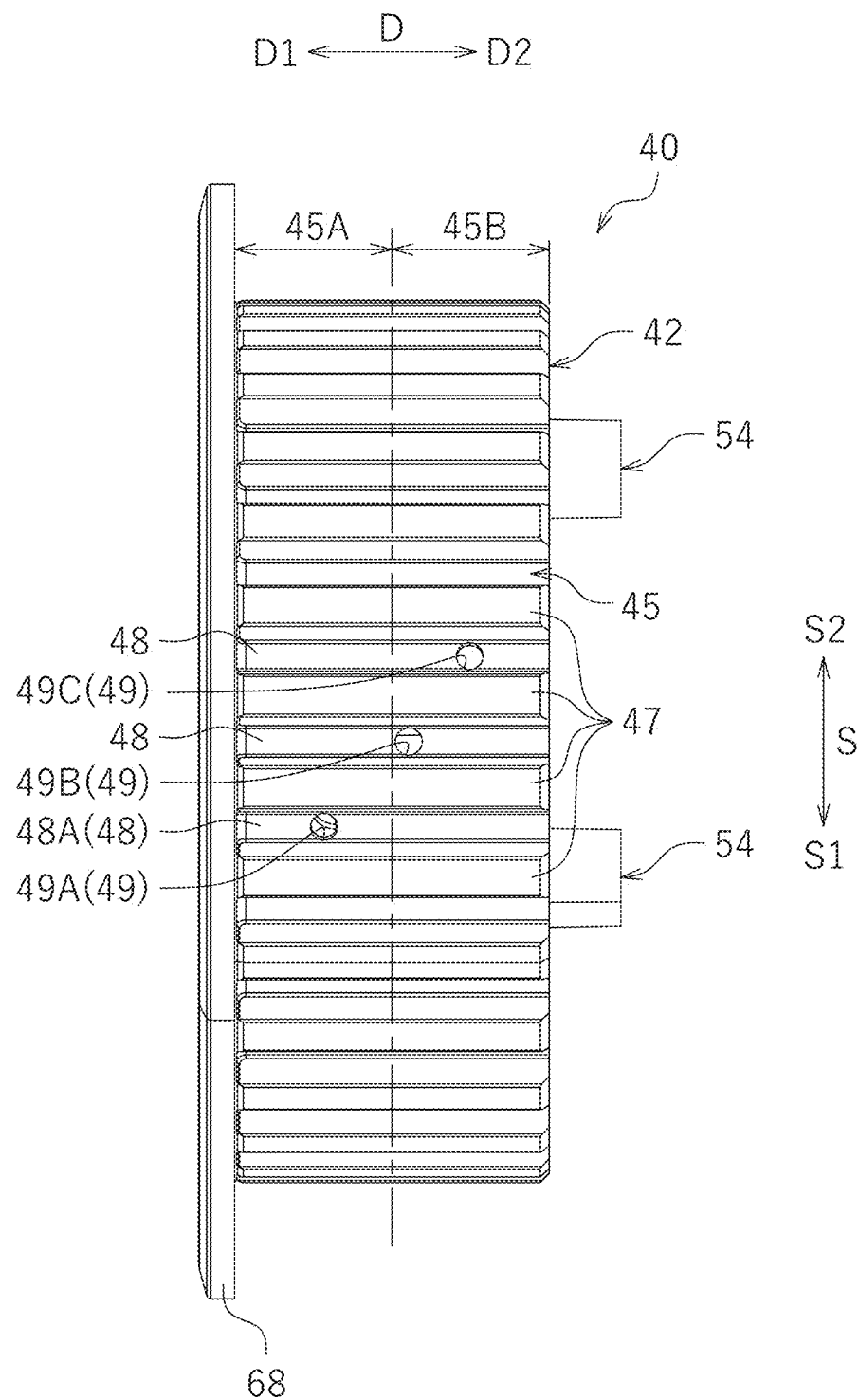
FIG. 12 is a side view of a clutch center according to the first preferred embodiment of the present invention.

As illustrated in FIG. 2, the oil flow holes 49 penetrate the outer peripheral wall 45 along the radial directions. Each of the oil flow holes 49 is formed between adjacent ones of the center-side fitting teeth 47. That is, the oil flow holes 49 are formed in the spline grooves 48. The oil flow holes 49 are formed at the sides of the center-side cam portions 60. More specifically, the discharge holes 49 are formed at the sides of the center-side slipper cam surfaces 60S of the center-side cam portions 60. The oil flow holes 49 cause the inside and outside of the clutch center 40 to communicate with each other. The oil flow holes 49 allow clutch oil that has flowed from the output shaft 15 into the clutch center 40 to be discharged to the outside of the clutch center 40. The oil flow holes 49 allow clutch oil flowing at the inner peripheral side of the outer peripheral wall 45 to be discharged to the outside of the clutch center 40. The oil flow holes 49 allow clutch oil flowing outside the clutch center 40 to flow to the inside of the clutch center 40. Although the oil flow holes 49 of this preferred embodiment have circular shapes, the shapes of the oil flow holes 49 are not particularly limited. As illustrated in FIG. 12, the oil flow holes 49 of this preferred embodiment include a first oil flow hole 49A located at the most advanced side in the first direction D1, a second oil flow hole 49B located ahead of the first oil flow hole 49A in the second direction D2, and a third oil flow hole 49C located ahead of the second oil flow hole 49B in the second direction D2. The first oil flow hole 49A, the second oil flow hole 49B, and the third oil flow hole 49C have the same or substantially the same shape (i.e., the same or substantially the same opening area), but may have different shapes. Although the oil flow holes 49 include the first oil flow hole 49A, the second oil flow hole 49B, and the third oil flow hole 49C, the number of the oil flow holes is not limited to three. The first oil flow hole 49A, the second oil flow hole 49B, and the third oil flow hole 49C are formed in different spline grooves 48. As illustrated in FIG. 2, the first oil flow hole 49A, the second oil flow hole 49B, and the third oil flow hole 49C are formed along the center-side slipper cam surface 60S. In the circumferential directions S, the first oil flow hole 49A and the second oil flow hole 49B are formed between an end 60SB of the center-side slipper cam surface 60S in the second circumferential direction S2 and a center-side cam hole 43H described later and located ahead, in the first circumferential direction S1, of the end 60SB in the second circumferential direction S2. In the circumferential direction S, the first oil flow hole 49A is formed between an end 60SD of the center-side slipper cam surface 60S in the first circumferential direction S1 and the center-side cam hole 43H located ahead, in the first circumferential direction S1, of the end 60SD in the first circumferential direction S1. In the circumferential direction S, the first oil flow hole 49A is formed between the end 60SD of the center-side slipper cam surface 60S in the first circumferential direction S1 and a boss 54 located ahead, in the first circumferential direction S1, of the end 60SD in the first circumferential direction S1. The first oil flow hole 49A is formed in a spline groove 48A closest to the end 60SD of the center-side slipper cam surface 60S in the first circumferential direction S1 in the first circumferential direction S1. The first oil flow hole 49A is located radially outward of a through hole 43P described later. The first oil flow hole 49A is located ahead of a surface 43A of the base wall 43 in the first direction D1. The second oil flow hole 49B is located radially outward of the center-side slipper cam surface 60S. The second oil flow hole 49B is located ahead, in the second direction D2, of the end 60SD of the center-side slipper cam surface 60S in the first circumferential direction S1. The second oil flow hole 49B is located ahead, in the first direction D1, of the end 60SB of the center-side slipper cam surface 60S in the second circumferential direction S2. The third oil flow hole 49C is formed in the center-side fitting portion 58. The third oil flow hole 49C is located ahead, in the second direction D2, of the end 60SB of the center-side slipper cam surface 60S in the second circumferential direction S2. The third oil flow hole 49C is located between the center-side slipper cam surface 60S and the center-side assist cam surface 60A in the circumferential directions S.

As illustrated in FIG. 12, when the outer peripheral wall 45 is evenly divided, with respect to in the axial directions (i.e., directions D) of the output shaft 15, into two portions of a first portion 45A located on the side of the first direction D1 and a second portion 45B located on the side of the second direction D2, the total opening area of the oil flow holes 49 (the second oil flow hole 49B and the third oil flow hole 49C in this preferred embodiment) located in the second portion 45B is larger than the total opening area of the oil flow holes 49 (the first oil flow hole 49A in this preferred embodiment) located in the first portion 45A. In this preferred embodiment, the plurality of oil flow holes 49 have the same or substantially the same shape, the number of the oil flow holes 49 located in the second portion 45B is two, and the number of the oil flow holes 49 located in the first portion 45A is one. That is, the number of the oil flow holes 49 located in the second portion 45B is larger than the number of the oil flow holes 49 located in the first portion 45A. Even in a case where the number of the oil flow holes 49 located in the second portion 45B is smaller than the number of the oil flow holes 49 located in the first portion 45A, since the oil flow holes 49 located in the second portion 45B have the different shape from that of the oil flow holes 49 located in the first portion 45A, the total opening area of the oil flow holes 49 located in the second portion 45B can be larger than the total opening area of the oil flow holes 49 located in the first portion 45A.

The output-side rotating plates 22 are held by the spline fitting portion 46 of the clutch center 40 and the pressure plate 70. A portion of the output-side rotating plates 22 is held by the center-side fitting teeth 47 of the clutch center 40 and the spline grooves 48 by spline fitting. Another portion of the output-side rotating plates 22 is held by a pressure-side fitting teeth 77 (see FIG. 4) described later of the pressure plate 70. The output-side rotating plates 22 are displaceable along the axial directions of the clutch center 40. The output-side rotating plates 22 are rotatable together with the clutch center 40.

The output-side rotating plates 22 are pushed against the input-side rotating plates 20. The output-side rotating plates 22 are ring-shaped flat plates. Each of the output-side rotating plates 22 is shaped by punching a thin plate of an SPCC material into a ring shape. The front and back surfaces of the output-side rotating plates 22 have grooves with depths of several micrometers to several tens of micrometers, for example, to hold clutch oil. The front and back surfaces of the output-side rotating plates 22 are subjected to a surface hardening treatment to enhance abrasion resistance. The friction members provided on the input-side rotating plates 20 may be provided on the output-side rotating plates 22 instead of the input-side rotating plates 20, or may be provided on both the input-side rotating plates 20 and the output-side rotating plates 22.

Figure 3:
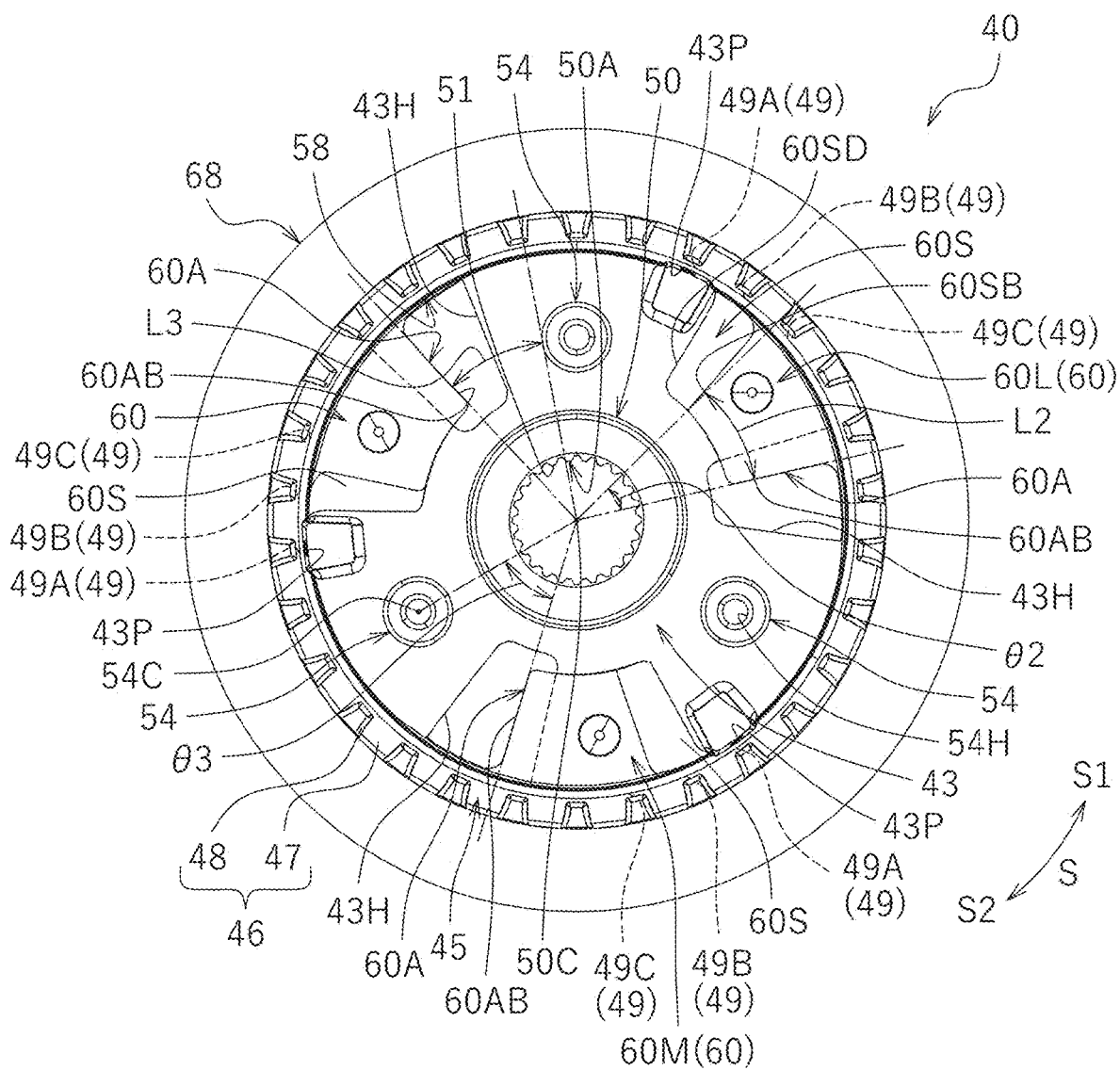
FIG. 3 is a plan view of a clutch center according to the first preferred embodiment of the present invention.

Each of the center-side cam portions 60 is formed in a trapezoidal shape including a cam surface of a slope defining an assist & slipper (registered trademark) mechanism that generates an assist torque as a force of increasing a pressing force (contact pressure force) between the input-side rotating plates 20 and the output-side rotating plates 22 or a slipper torque as a force of separating the input-side rotating plates 20 and the output-side rotating plates 22 from each other early and shifting these plates into a half-clutch state. The center-side cam portions 60 project from the base wall 43 in the second direction D2. As illustrated in FIG. 3, the center-side cam portions 60 are arranged at regular or substantially regular intervals in the circumferential directions S of the clutch center 40. In this preferred embodiment, the clutch center 40 includes three center-side cam portions 60, but the number of the center-side cam portions 60 is not limited to three.

As illustrated in FIG. 3, the center-side cam portions 60 are located radially outward of the output shaft holding portion 50. Each of the center-side cam portions 60 includes the center-side assist cam surface 60A and the center-side slipper cam surface 60S. The center-side assist cam surface 60A faces in the first direction D1. The center-side slipper cam surface 60S faces in the second direction D2. The center-side assist cam surface 60A is configured to generate a force in a direction in which the pressure plate 70 approaches the clutch center 40 in order to increase a pressing force (contact pressure force) between the input-side rotating plates 20 and the output-side rotating plates 22 upon rotation relative the pressure plate 70. In this preferred embodiment, when this force is generated, the position of the pressure plate 70 to the clutch center 40 does not change, and the pressure plate 70 does not need to approach the clutch center 40 physically. The pressure plate 70 may be physically displaced with respect to the clutch center 40. The center-side slipper cam surface 60S is configured to separate the pressure plate 70 from the clutch center 40 in order to reduce the pressing force (contact pressure force) between the input-side rotating plates 20 and the output-side rotating plates 22 upon rotation relative to the pressure plate 70. In the center-side cam portions 60 adjacent to each other in the circumferential directions S, the center-side assist cam surface 60A of one center-side cam portion 60L and the center-side slipper cam surface 60S of the other center-side cam portion 60M are opposed to each other in the circumferential directions S. The center-side slipper cam surface 60S is an example of a center-side cam surface.

As illustrated in FIG. 2, the clutch center 40 includes the plurality of (for example, three in this preferred embodiment) bosses 54. The bosses 54 support the pressure plate 70. The plurality of bosses 54 are arranged at regular or substantially regular intervals in the circumferential directions S. Each of the bosses 54 has a cylindrical shape. The bosses 54 are located radially outward of the output shaft holding portion 50. The bosses 54 extend toward the pressure plate 70 (i.e., in the second direction D2). The bosses 54 are disposed on the base wall 43. The bosses 54 have screw holes 54H in which bolts 28 (see FIG. 1) are inserted. The screw holes 54H extend in the axial directions of the clutch center 40.

As illustrated in FIG. 2, the center-side fitting portion 58 is located radially outward of the output shaft holding portion 50. The center-side fitting portion 58 is located radially outward of the center-side cam portions 60. The center-side fitting portion 58 is disposed ahead of the center-side cam portions 60 in the second direction D2. The center-side fitting portion 58 is formed on the inner peripheral surface of the outer peripheral wall 45. The center-side fitting portion 58 is slidably fitted onto a pressure-side fitting portion 88 (see FIG. 4) described later. The inner diameter of the center-side fitting portion 58 has a fitting tolerance allowing distribution of clutch oil flowing out of a distal end 15T of the output shaft 15 to the pressure-side fitting portion 88. That is, a gap is formed between the center-side fitting portion 58 and the pressure-side fitting portion 88 described later. In this preferred embodiment, for example, the center-side fitting portion 58 has an inner diameter larger than the outer diameter of the pressure-side fitting portion 88 by about 0.1 mm. This dimensional tolerance between the inner diameter of the center-side fitting portion 58 and the outer diameter of the pressure-side fitting portion 88 is appropriately set in accordance with the amount of clutch oil intended to be distributed, and is, for example, about 0.1 mm or more and about 0.5 mm or less.

As illustrated in FIGS. 2 and 3, the clutch center 40 includes the center-side cam holes 43H penetrating a portion of the base wall 43. The center-side cam holes 43H penetrate the base wall 43 in the directions D. Each of the center-side cam holes 43H is formed between adjacent ones of the center-side cam portions 60. The center-side cam holes 43H extend from portions on the side of the output shaft holding portion 50 to the outer peripheral wall 45. Each center-side cam hole 43H is formed between the center-side assist cam surface 60A of the center-side cam portion 60 and the boss 54. When seen in the axial direction of the clutch center 40, the center-side assist cam surface 60A overlaps with a portion of the center-side cam hole 43H. The center-side cam hole 43H is an example of a first through hole.

As illustrated in FIGS. 2 and 3, the clutch center 40 includes the through hole 43P penetrating a portion of the base wall 43. The through hole 43P penetrates the base wall 43 in the directions D. The through hole 43P is formed between the center-side cam portion 60 and the center-side cam hole 43H. The through hole 43P is located ahead, in the first circumferential direction S1, of the end 60SD of the center-side slipper cam surface 60S in the first circumferential direction S1. The through hole 43P is located ahead of the boss 54 in the second circumferential direction S2. The through hole 43P is located radially outward of the boss 54. The through hole 43P is adjacent to the center-side slipper cam surface 60S. The through hole 43P is smaller than the center-side cam hole 43H. The through hole 43P causes the inside and outside of the clutch center 40 to communicate with each other. The through hole 43P is configured to guide clutch oil flowing outside the clutch center 40 to the inside of the clutch center 40. More specifically, as indicated by arrow FS in FIG. 1, clutch oil that has flowed out from the output shaft 15 toward the clutch center 40 flows into the clutch center 40 through the through hole 43P. The through hole 43P communicates with the first oil flow hole 49A. The through hole 43P is an example of a second through hole.

As illustrated in FIG. 1, the pressure plate 70 is movable toward or away from the clutch center 40 and rotatable relative to the clutch center 40. The pressure plate 70 is configured to press the input-side rotating plates 20 and the output-side rotating plates 22. The pressure plate 70 is disposed coaxially with the clutch center 40 and the clutch housing 30. The pressure plate 70 includes a body 72, and a flange 98 connected to the outer edge of the body 72 on the side of the second direction D2 and extending radially outward. The body 72 projects ahead of the flange 98 in the first direction D1. The flange 98 is located radially outward of a cylindrical portion 80 (see FIG. 4) described later. The pressure plate 70 holds the plurality of output-side rotating plates 22 arranged alternately with the input-side rotating plates 20. The flange 98 is configured to press the input-side rotating plates 20 and the output-side rotating plates 22.

Figure 4:
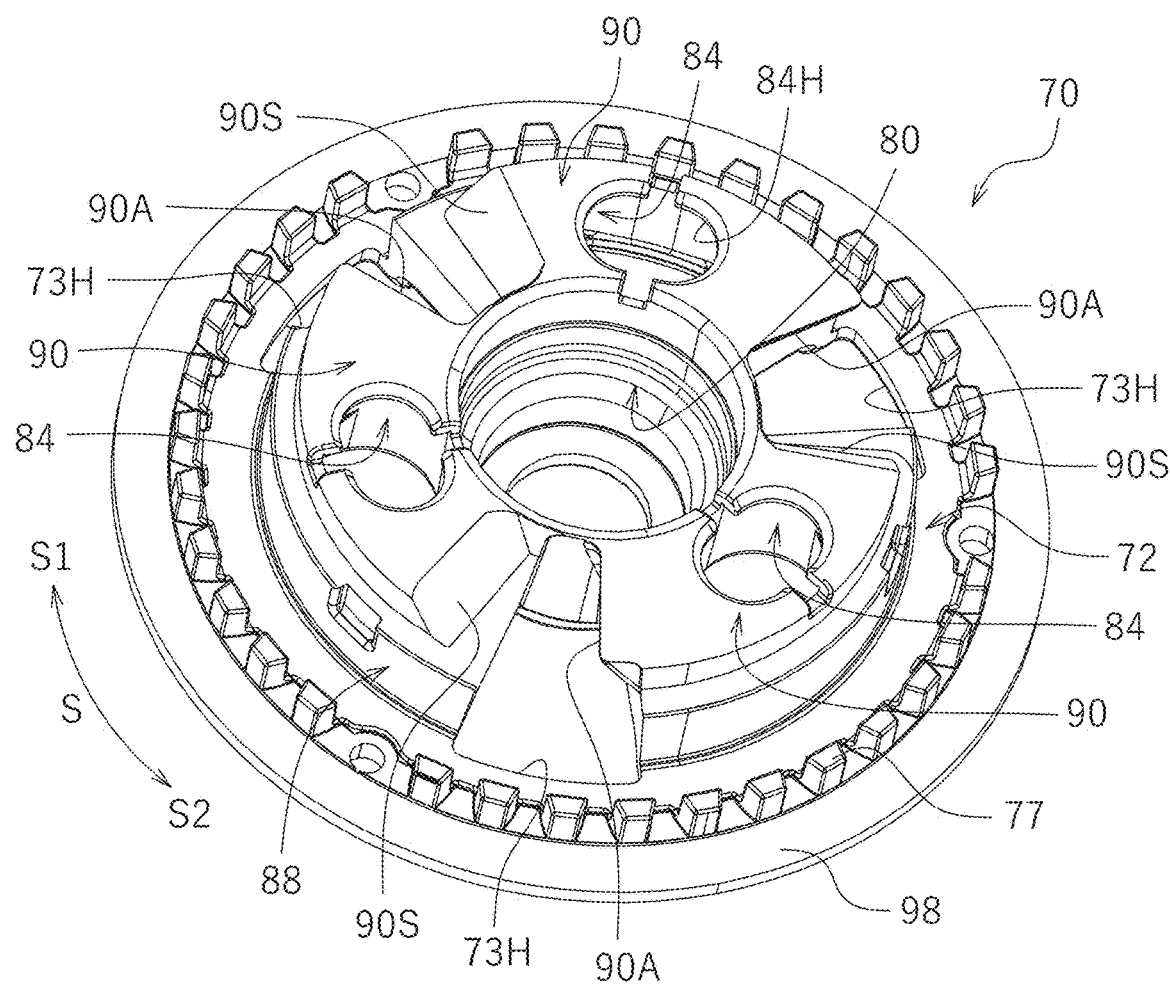
FIG. 4 is a perspective view of a pressure plate according to the first preferred embodiment of the present invention.
Figure 6:
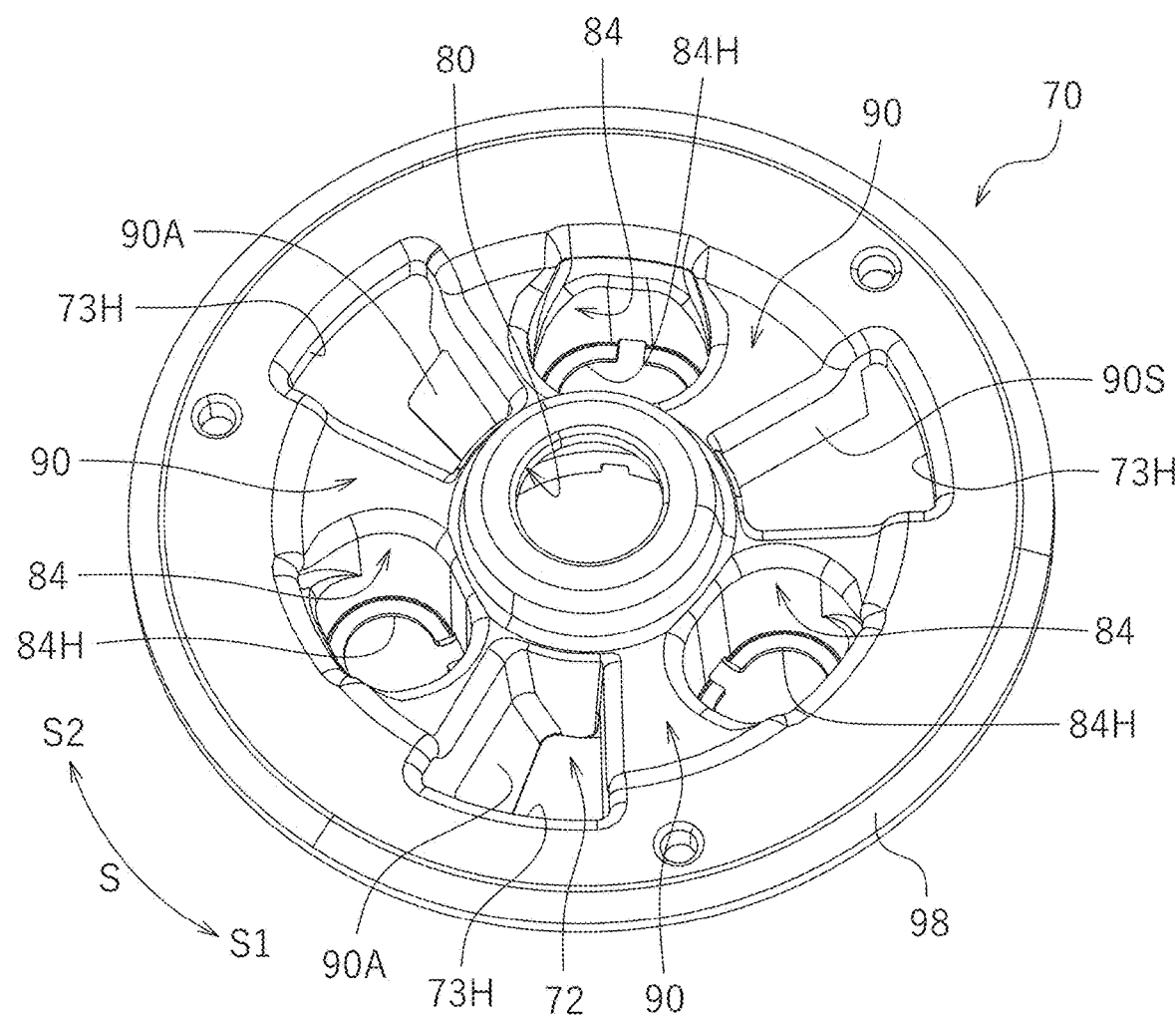
FIG. 6 is a perspective view of a pressure plate according to the first preferred embodiment of the present invention.

As illustrated in FIG. 4, the body 72 includes the cylindrical portion 80, the plurality of pressure-side cam portions 90, the pressure-side fitting portion 88, and a spring housing portion 84 (see also FIG. 6).

The cylindrical portion 80 has a cylindrical shape. The cylindrical portion 80 is integrally formed with the pressure-side cam portions 90. The cylindrical portion 80 houses the distal end 15T of the output shaft 15 (see FIG. 1). The cylindrical portion 80 houses the release bearing 18 (see FIG. 1). The cylindrical portion 80 receives a pressing force from the push member 16B. The cylindrical portion 80 receives clutch oil that has flowed out from the distal end 15T of the output shaft 15.

Figure 5:
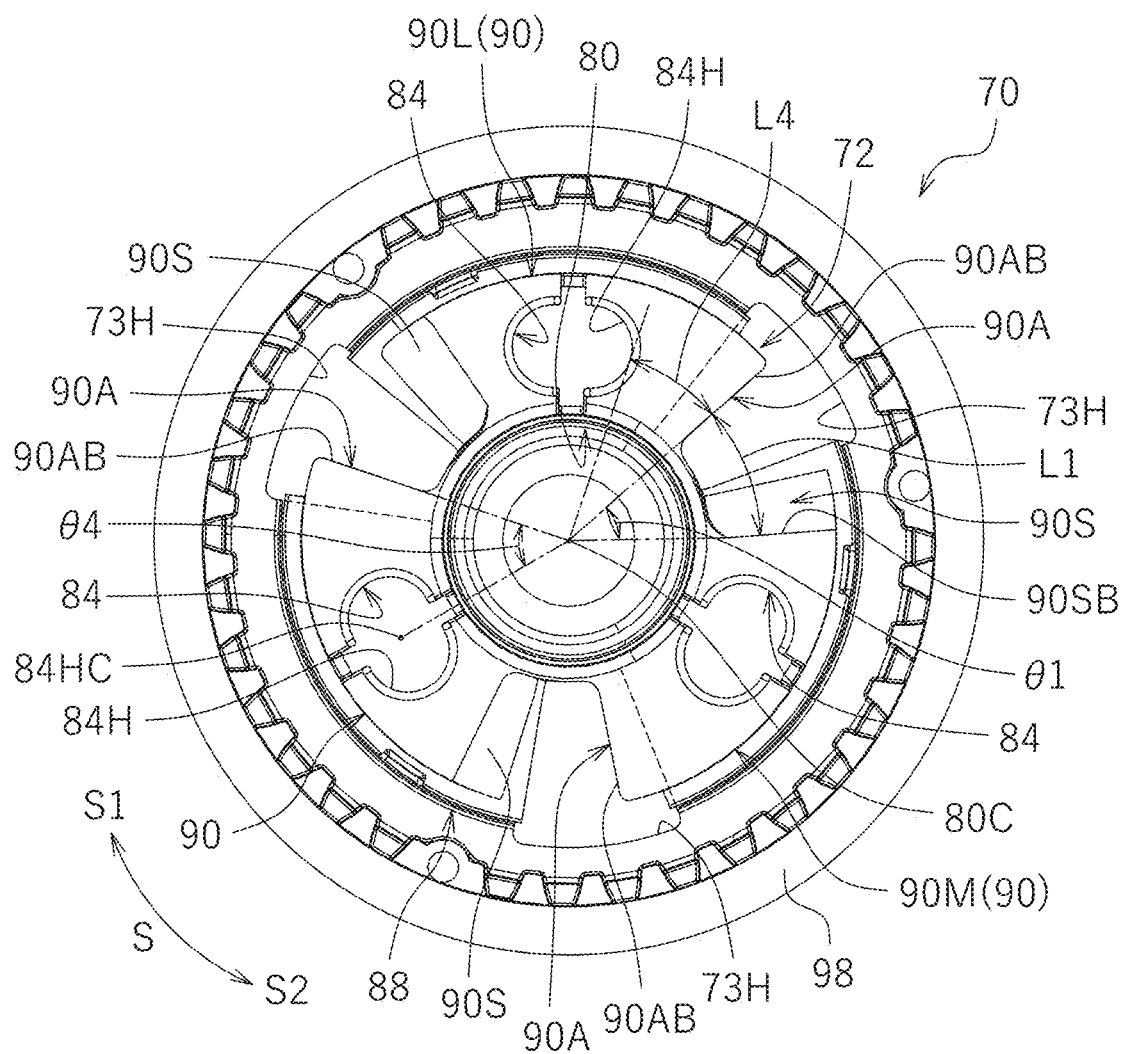
FIG. 5 is a plan view of a pressure plate according to the first preferred embodiment of the present invention.

Each of the pressure-side cam portions 90 is formed in a trapezoidal shape having a cam surface of a slope constituting an assist & slipper (registered trademark) mechanism that slides on the center-side cam portions 60 and generates an assist torque or a slipper torque. The pressure-side cam portions 90 project from the flange 98 in the first direction D1. As illustrated in FIG. 5, the pressure-side cam portions 90 are arranged at regular or substantially regular intervals in the circumferential directions S of the pressure plate 70. In this preferred embodiment, the pressure plate 70 includes three pressure-side cam portions 90, but the number of the pressure-side cam portions 90 is not limited to three.

Figure 9:
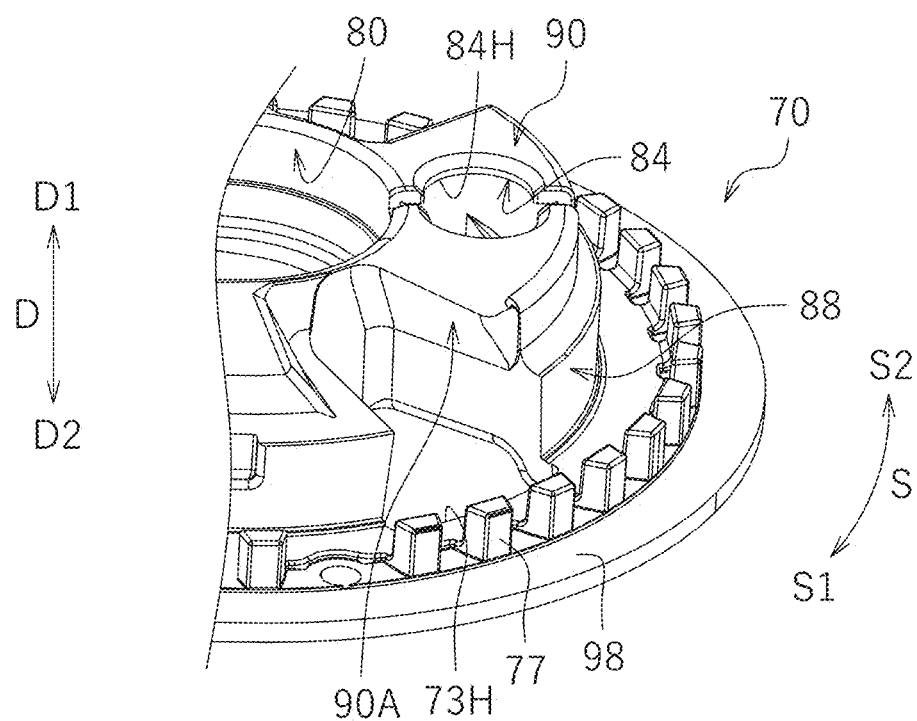
FIG. 9 is an enlarged perspective view of a portion of a pressure plate according to the first preferred embodiment of the present invention.

As illustrated in FIG. 5, the pressure-side cam portion 90 is located radially outward of the cylindrical portion 80. Each of the pressure-side cam portions 90 includes a pressure-side assist cam surface 90A (see also FIGS. 7 and 9) and a pressure-side slipper cam surface 90S. The pressure-side assist cam surface 90A can be brought into contact with the center-side assist cam surface 60A. The pressure-side assist cam surface 90A is configured to generate a force in a direction in which the pressure plate 70 approaches the clutch center 40 in order to increase a pressing force (contact pressure force) between the input-side rotating plates 20 and the output-side rotating plates 22 upon rotation relative to the clutch center 40. The pressure-side slipper cam surface 90S can be brought into contact with the center-side slipper cam surface 60S. The pressure-side slipper cam surface 90S is configured to separate the pressure plate 70 from the clutch center 40 in order to reduce a pressing force (contact pressure force) between the input-side rotating plates 20 and the output-side rotating plates 22 upon rotation relative to the clutch center 40. In the pressure-side cam portions 90 adjacent to each other in the circumferential directions S, the pressure-side assist cam surface 90A of one pressure-side cam portion 90L and the pressure-side slipper cam surface 90S of the other pressure-side cam portion 90M are opposed to each other in the circumferential directions S.

Figure 8:
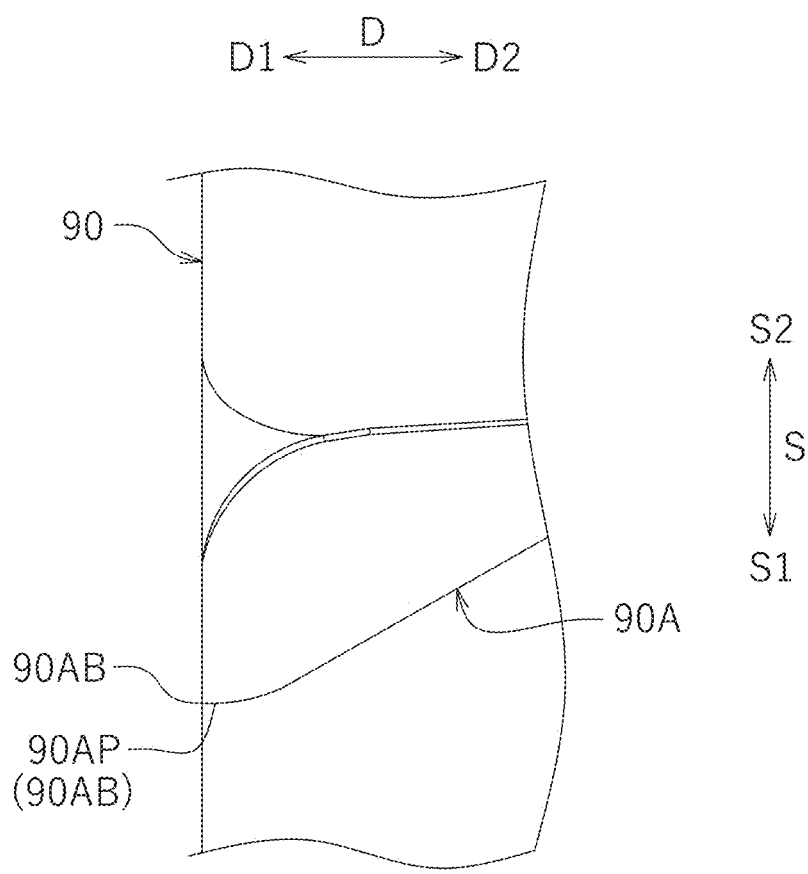
FIG. 8 is an enlarged side view of a portion of a pressure-side cam portion according to the first preferred embodiment of the present invention.

As illustrated in FIG. 8, an end of the pressure-side assist cam surface 90A of each pressure-side cam portion 90 in the circumferential directions S includes a chamfered portion 90AP that is linearly chamfered. A corner of the chamfered portion 90AP (corner on the side of the first direction D1 and the first circumferential direction S1) includes a right angle. More specifically, the chamfered portion 90AP is formed in an end 90AB of the pressure-side assist cam surface 90A in the first circumferential direction S1.

Figure 11A:
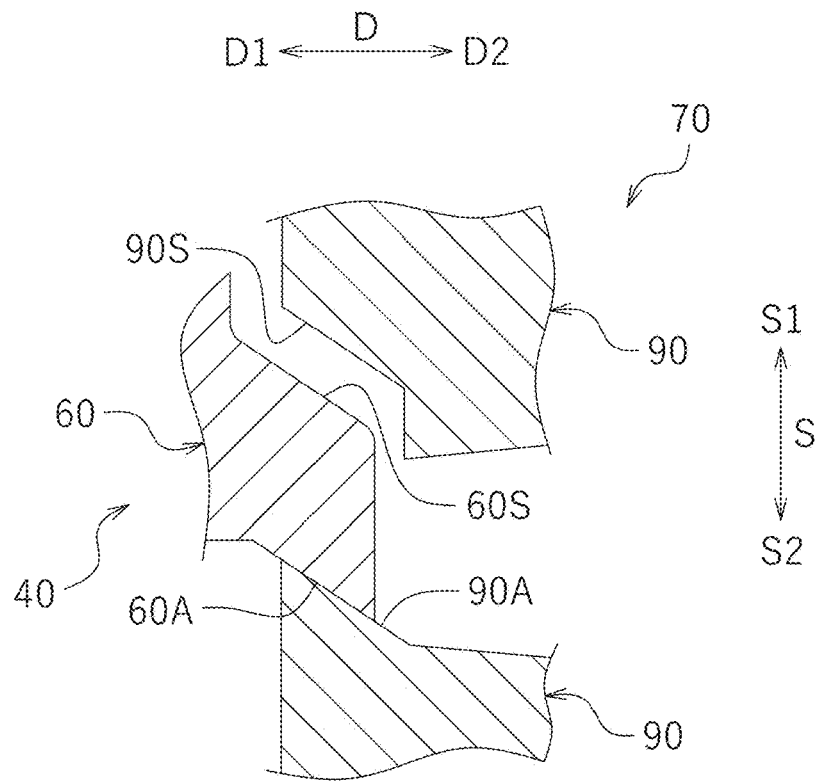
FIG. 11A is a schematic view for describing effects of a center-side assist cam surface and a pressure-side assist cam surface.

Advantages of the center-side cam portions 60 and the pressure-side cam portions 90 will now be described. When the rotation speed of the engine increases so that a rotation driving force input to the input gear 35 and the clutch housing 30 is thereby allowed to be transferred to the output shaft 15 through the clutch center 40, a rotation force in the first circumferential direction S1 is applied to the pressure plate 70, as illustrated in FIG. 11A. Thus, with the effects of the center-side assist cam surface 60A and the pressure-side assist cam surface 90A, a force in first direction D1 is generated in the pressure plate 70. Accordingly, a contact pressure force between the input-side rotating plates 20 and the output-side rotating plates 22 increases.

Figure 11B:
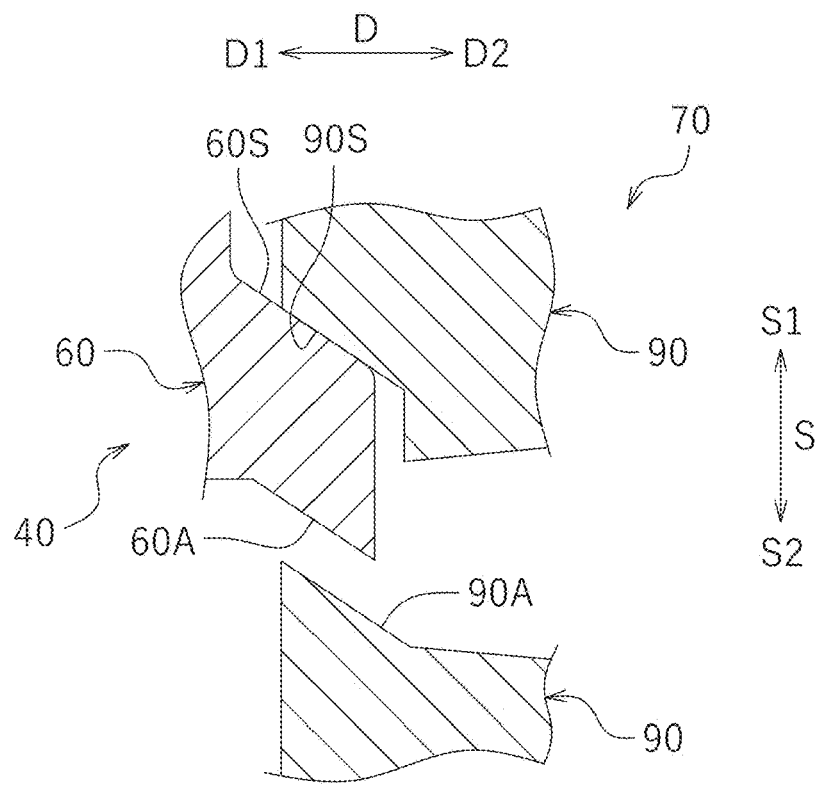
FIG. 11B is a schematic view for describing effects of a center-side slipper cam surface and a pressure-side slipper cam surface.

On the other hand, when the rotation speed of the output shaft 15 exceeds the rotation speed of the input gear 35 and the clutch housing 30 and a back torque is generated, a rotation force in the first circumferential direction S1 is applied to the clutch center 40, as illustrated in FIG. 11B. Thus, with the effects of the center-side slipper cam surface 60S and the pressure-side slipper cam surface 90S, the pressure plate 70 moves in the second direction D2 and releases a contact pressure force between the input-side rotating plates 20 and the output-side rotating plates 22. In this manner, it is possible to avoid problems in the engine and the transmission caused by the back torque.

As illustrated in FIG. 4, the pressure-side fitting portion 88 is located radially outside of the pressure-side cam portions 90. The pressure-side fitting portion 88 is located ahead of the pressure-side cam portions 90 in the second direction D2. The pressure-side fitting portion 88 is configured to slidably fit in the center-side fitting portion 58 (see FIG. 2).

Figure 7:
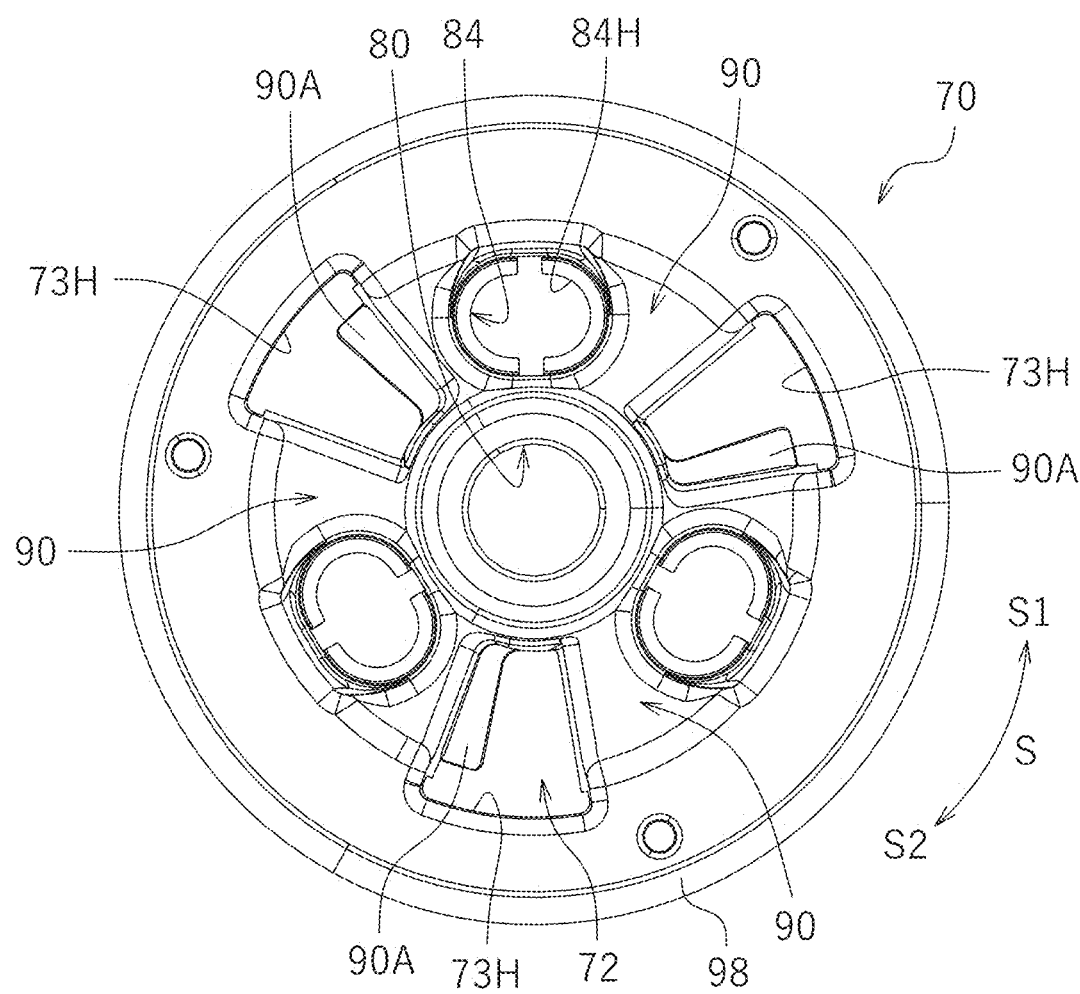
FIG. 7 is a plan view of a pressure plate according to the first preferred embodiment of the present invention.

As illustrated in FIGS. 4 and 5, the pressure plate 70 includes pressure-side cam holes 73H penetrating the body 72 and a portion of the flange 98. The pressure-side cam holes 73H are located radially outward of the cylindrical portion 80. The pressure-side cam holes 73H extend from portions on the side of the cylindrical portion 80 to the radially outside of the pressure-side fitting portion 88. Each of the pressure-side cam holes 73H is formed between the pressure-side assist cam surface 90A and the pressure-side slipper cam surface 90S of adjacent ones of the pressure-side cam portions 90. As illustrated in FIGS. 5 and 7, when seen in the axial direction of the pressure plate 70, the pressure-side assist cam surface 90A overlaps with portions of the pressure-side cam holes 73H.

As illustrated in FIG. 4, the pressure plate 70 includes the plurality of pressure-side fitting teeth 77 arranged on the flange 98. The pressure-side fitting teeth 77 hold the output-side rotating plates 22. The pressure-side fitting teeth 77 project from the flange 98 in the first direction D1. The pressure-side fitting teeth 77 are located radially outward of the cylindrical portion 80. The pressure-side fitting teeth 77 are located radially outward of the pressure-side cam portions 90. The pressure-side fitting teeth 77 are located radially outward of the pressure-side fitting portion 88. The plurality of pressure-side fitting teeth 77 are arranged in the circumferential directions S. The plurality of pressure-side fitting teeth 77 are arranged at regular or substantially regular intervals in the circumferential directions S. In this preferred embodiment, since a portion of the pressure-side fitting teeth 77 has been removed, the interval of this portion is enlarged, but the other adjacent pressure-side fitting teeth 77 are arranged at regular or substantially regular intervals.

As illustrated in FIGS. 6 and 7, the spring housing portions 84 are formed in the pressure-side cam portions 90. The spring housing portions 84 are recessed from the second direction D2 to the first direction D1. Each of the spring housing portions 84 has an oval shape. The spring housing portions 84 house pressure springs 25 (see FIG. 1). The spring housing portions 84 include the insertion holes 84H which penetrate the spring housing portions 84 and in which the bosses 54 (see FIG. 2) are inserted. That is, the insertion holes 84H penetrate the pressure-side cam portions 90. Each of the insertion holes 84H has an oval shape.

As illustrated in FIG. 1, the pressure springs 25 are housed in the spring housing portions 84. The pressure springs 25 are held by the bosses 54 inserted in the insertion holes 84H of the spring housing portions 84. The pressure springs 25 bias the pressure plate 70 toward the clutch center 40 (i.e., in the first direction D1). The pressure springs 25 are, for example, coil springs obtained by helically winding spring steel.

Figure 10:
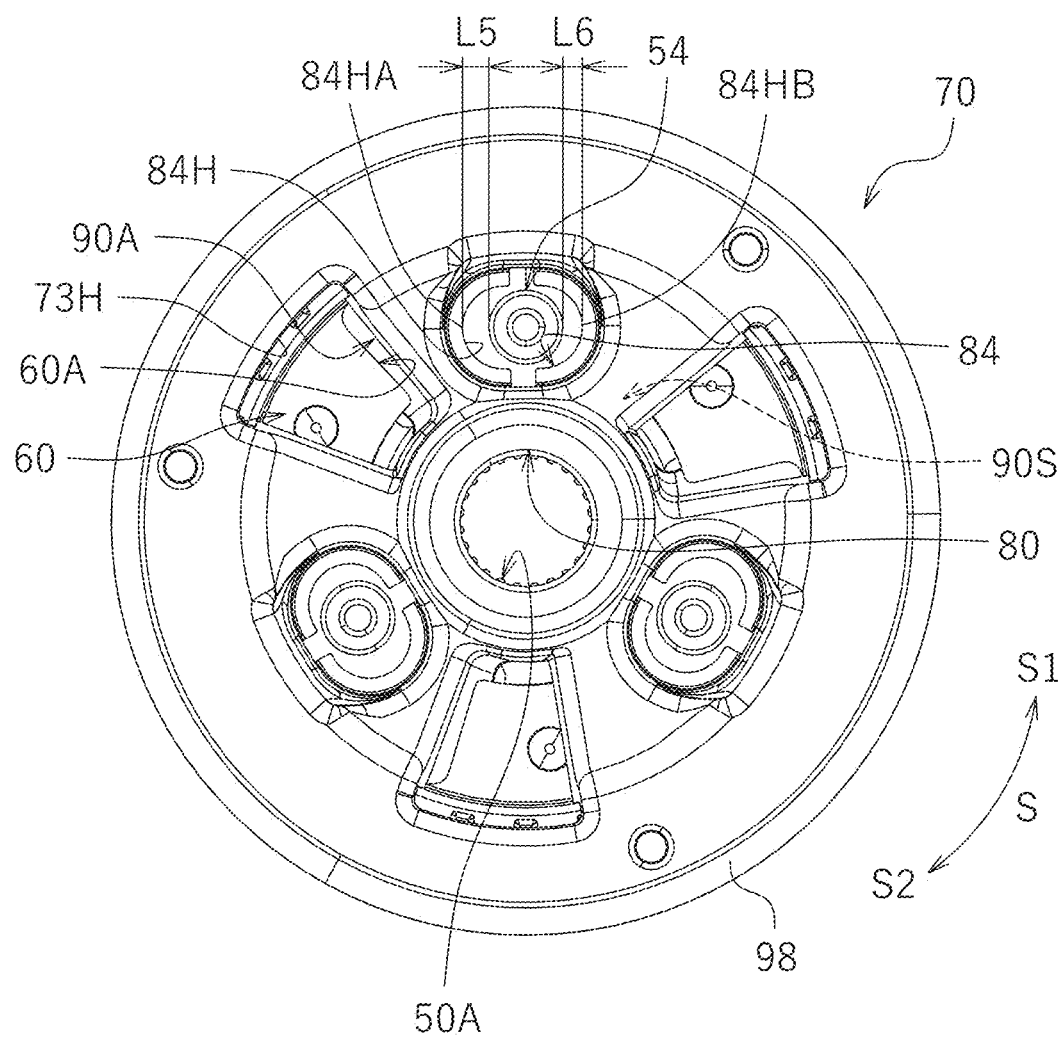
FIG. 10 is a plan view illustrating a state where a clutch center according to the first preferred embodiment of the present invention and a pressure plate are combined.

FIG. 10 is a plan view illustrating a state where the clutch center 40 and the pressure plate 70 are combined. In the state illustrated in FIG. 10, the pressure-side assist cam surface 90A and the center-side assist cam surface 60A do not contact each other, and the pressure-side slipper cam surface 90S and the center-side slipper cam surface 60S do not contact each other. At this time, the pressure plate 70 is closest to the clutch center 40. This state will be referred to as a normal state of the clutch device 10. As illustrated in FIG. 10, a distance L5 in the circumferential directions S between the boss 54 and an end 84HA of the insertion holes 84H toward the pressure-side assist cam surface 90A (i.e., ahead in the first circumferential direction S1) in the normal state is smaller than a distance L6 in the circumferential direction S between the boss 54 and an end 84HB of the insertion holes 84H toward the pressure-side slipper cam surface 90S (i.e., ahead in the second circumferential direction S2) in the normal state.

As illustrated in FIG. 1, the stopper plate 100 can contact the pressure plate 70. The stopper plate 100 reduces or prevents separation of the pressure plate 70 from the clutch center 40 by a predetermined distance or more in the second direction D2. The stopper plate 100 is fixed to the bosses 54 of the clutch center 40 with the bolts 28. The pressure plate 70 is fixed by fastening the bolts 28 to the bosses 54 through the stopper plate 100 with the bosses 54 and the pressure springs 25 of the clutch center 40 disposed in the spring housing portions 84. The stopper plate 100 is substantially triangular in plan view.

When the pressure plate 70 is brought into contact with the stopper plate 100, the pressure-side slipper cam surface 90S and the center-side slipper cam surface 60S are in contact with each other in an area of about 50% or more and about 90% or less of the area of the pressure-side slipper cam surface 90S and about 50% or more and about 90% or less of the area of the center-side slipper cam surface 60S, for example. When the pressure plate 70 is brought into contact with the stopper plate 100, the pressure springs 25 are separated from the side walls of the spring housing portions 84. That is, the pressure springs 25 are not sandwiched between the bosses 54 and the spring housing portions 84, and application of excessive stress to the bosses 54 is suppressed.

Here, a length L1 in the circumferential directions S (see FIG. 5) from the end 90AB of the pressure-side assist cam surface 90A in the first circumferential direction S1 of one pressure-side cam portion 90L located on the side of the first circumferential direction S1 in the pressure-side cam portions 90 adjacent to each other in the circumferential directions S to an end 90SB of the pressure-side slipper cam surface 90S in the first circumferential direction S1 of the other pressure-side cam portion 90M located on the side of the second circumferential direction S2 is larger than a length L2 in the circumferential directions (see FIG. 3) from an end 60AB of the center-side assist cam surface 60A in the second circumferential direction S2 to the end 60SB of the center-side slipper cam surface 60S in the second circumferential direction S2 in one center-side cam portion 60.

When seen in the axial directions of the output shaft 15, an angle θ1 (see FIG. 5) formed by a center 80C of the cylindrical portion 80, the end 90AB of the pressure-side assist cam surface 90A in the first circumferential direction S1 located on the side of the first circumferential direction S1 of one pressure-side cam portion 90L in the pressure-side cam portions 90 adjacent to each other in the circumferential directions S, and the end 90SB of the pressure-side slipper cam surface 90S in the first circumferential direction S1 located on the side of the second circumferential direction S2 of the other pressure-side cam portion 90M is larger than an angle θ2 (see FIG. 3) formed by a center 50C of the output shaft holding portion 50, the end 60AB of the center-side assist cam surface 60A in the second circumferential direction S2, and the end 60SB of the center-side slipper cam surface 60S in the second circumferential direction S2 in one center-side cam portion 60.

A length L3 in the circumferential directions S (see FIG. 3) from the end 60AB of the center-side assist cam surface 60A in the second circumferential direction S2 to the boss 54 is larger than a length L4 in the circumferential directions S (see FIG. 5) from the end 90AB of the pressure-side assist cam surface 90A in the first circumferential direction S1 to the insertion hole 84H.

When seen in the axial directions of the output shaft 15, an angle θ3 (see FIG. 3) formed by the center 50C of the output shaft holding portion 50, the end 60AB in the second circumferential direction S2 of the center-side assist cam surface 60A of the center-side cam portion 60, and a center 54C of the boss 54 is larger than an angle θ4 (see FIG. 5) formed by the center 80C of the cylindrical portion 80, the end 90AB of the pressure-side assist cam surface 90A in the first circumferential direction S1, and a center 84HC of the insertion hole 84H.

The clutch device 10 is filled with a predetermined amount of clutch oil. Clutch oil is distributed in the clutch center 40 and the pressure plate 70 through the hollow portion 15H of the output shaft 15, and then is supplied to the input-side rotating plates 20 and the output-side rotating plates 22 through the gap between the center-side fitting portion 58 and the pressure-side fitting portion 88 and the oil flow holes 49. Clutch oil is also distributed from the outside of the clutch center 40 through the hollow portion 15H of the output shaft 15 into the clutch center 40 through the through hole 43P. Since the clutch center 40 rotates in the first circumferential direction S1, clutch oil in the clutch center 40 tends to be collected by a centrifugal force to a portion before the center-side slipper cam surfaces 60S of the center-side cam portions 60. Clutch oil reduces or prevents absorption of heat and abrasion of the friction members. The clutch device 10 according to this preferred embodiment is a so-called multiplate wet friction clutch device.

Operation of the clutch device 10 according to this preferred embodiment will now be described. As described above, the clutch device 10 is disposed between the engine and the transmission of the motorcycle, and allows or interrupts transfer of a rotation driving force of the engine to the transmission by driver's operation of a clutch operation lever.

In the clutch device 10, in a case where the driver of the motorcycle does not operate the clutch operation lever, a clutch release mechanism (not shown) does not press the push rod 16A, and thus, the pressure plate 70 presses the input-side rotating plates 20 with a biasing force (elastic force) of the pressure springs 25. Accordingly, the clutch center 40 enters a clutch-ON state in which the input-side rotating plates 20 and the output-side rotating plates 22 are pushed against each other to be friction coupled, and is rotationally driven. That is, a rotation driving force of the engine is transferred to the clutch center 40, and the output shaft 15 is rotationally driven.

In the clutch-ON state, clutch oil distributed in the hollow portion H of the output shaft 15 and having flowed out from the distal end 15T of the output shaft 15 is dropped or spattered in the cylindrical portion 80 and attached to the cylindrical portion 80 (see arrow F in FIG. 1). The clutch oil attached to the inside of the cylindrical portion 80 is guided into the clutch center 40. Accordingly, clutch oil flows out of the clutch center 40 through the oil flow holes 49. Clutch oil also flows out of the clutch center 40 through the gap between the center-side fitting portion 58 and the pressure-side fitting portion 88. Then, clutch oil that has flowed out of the clutch center 40 is supplied to the input-side rotating plates 20 and the output-side rotating plates 22.

On the other hand, in the clutch device 10, when the driver of the motorcycle operates the clutch operation lever in the clutch-ON state, the clutch release mechanism (not shown) presses the push rod 16A, and thus, the pressure plate 70 is displaced in a direction away from the clutch center 40 (second direction D2) against a biasing force of the pressure springs 25. Accordingly, the clutch center 40 enters a clutch-OFF state in which friction coupling between the input-side rotating plates 20 and the output-side rotating plates 22 is canceled, and thus, rotational driving attenuates or stops. That is, a rotation driving force of the engine is interrupted to the clutch center 40.

In the clutch-OFF state, clutch oil distributed in the hollow portion H of the output shaft 15 and having flowed out of the distal end 15T of the output shaft 15 is guided into the clutch center 40 in the same or substantially the same manner as in the clutch-ON state. At this time, since the pressure plate 70 is separated from the clutch center 40, the amount of fitting between the pressure plate 70 and each of the center-side fitting portion 58 and the pressure-side fitting portion 88 decreases. As a result, clutch oil in the cylindrical portion 80 actively flows out of the clutch center 40, and is distributed to portions in the clutch device 10. In particular, clutch oil can be actively guided to gaps between the input-side rotating plates 20 and the output-side rotating plates 22 separated from each other.

Then, when the driver cancels the clutch operation lever in the clutch-OFF state, pressing of the pressure plate 70 by the clutch release mechanism (not shown) through the push member 16B is canceled, and thus, the pressure plate 70 is displaced with a biasing force of the pressure springs 25 to a direction (first direction D1) of approaching the clutch center 40.

As described above, in the clutch device 10 according to this preferred embodiment, the clutch center 40 rotates in the first circumferential direction S1 that is a direction from the center-side assist cam surface 60A to the center-side slipper cam surface 60S of one center-side cam portion 60. Thus, clutch oil in the clutch center 40 moves from the center-side cam hole 43H toward the center-side slipper cam surface 60S along the outer peripheral wall 45 by a centrifugal force. In the circumferential directions S, each of the oil flow holes 49 is formed between the end 60SB of the center-side slipper cam surface 60S in the second circumferential direction S2 and the center-side cam hole 43H located ahead, in the first circumferential direction S1, of the end 60SB in the second circumferential direction S2. Thus, clutch oil in the clutch center 40 can be efficiently discharged to the outside of the clutch center 40 through the oil flow holes 49 and supplied to the input-side rotating plates 20 and the output-side rotating plates 22.

In the clutch device 10 according to this preferred embodiment, in the circumferential directions S, the first oil flow hole 49A is formed between the end 60SD of the center-side slipper cam surface 60S in the first circumferential direction S1 and the center-side cam hole 43H located ahead, in the first circumferential direction S1, of the end 60SD in the first circumferential direction S1. In this configuration, clutch oil in the clutch center 40 can be more efficiently discharged to the outside of the clutch center 40 through the first oil flow hole 49A.

In the clutch device 10 according to this preferred embodiment, the clutch center 40 includes the bosses 54 located radially outward of the output shaft holding portion 50 and extending toward the pressure plate 70, and the first oil flow hole 49A is formed between the end 60SD of the center-side slipper cam surface 60S in the first circumferential direction S1 and the boss 54 located ahead, in the first circumferential direction S1, of the end 60SD in the first circumferential direction S1 in the circumferential directions S. In this configuration, clutch oil in the clutch center 40 can be even more efficiently discharged to the outside of the clutch center 49A through the first oil flow hole 49A.

In the clutch device 10 according to this preferred embodiment, the clutch center 40 includes the through hole 43P located ahead, in the first circumferential direction S1, of the end 60SD of the center-side slipper cam surface 60S in the first circumferential direction S1, and the through hole 43P is configured to guide clutch oil flowing outside the clutch center 40 to the inside of the clutch center 40. In this configuration, a large amount of clutch oil flows near the end 60SD of the center-side slipper cam surface 60S in the first circumferential direction S1, and thus, the first oil flow hole 49A formed in this portion enables clutch oil in the clutch center 40 to be more efficiently discharged to the outside of the clutch center 40.

In the clutch device 10 according to this preferred embodiment, the clutch center 40 includes the plurality of oil flow holes 49, and when the outer peripheral wall 45 is evenly divided, with respect to the axial directions (i.e., directions D) of the output shaft 15, into two portions of the first portion 45A located on the side of the first direction D1 and the second portion 45B located on the side of the second direction D2, the total opening area of the oil flow holes 49 located in the second portion 45B is larger than the total opening area of the oil flow holes 49 located in the first portion 45A. In this configuration, clutch oil in the clutch center 40 can be more efficiently discharged toward the pressure plate 70.

In the clutch device 10 according to this preferred embodiment, in a case where the plurality of oil flow holes 49 have the same or substantially the same shape, the number of the oil flow holes 49 located in the second portion 45B is larger than the number of the oil flow holes 49 located in the first portion 45A. In this configuration, clutch oil in the clutch center 40 can be more efficiently discharged toward the pressure plate 70.

In the clutch device 10 according to this preferred embodiment, the clutch center 40 includes the plurality of oil flow holes 49 that are formed along the center-side slipper cam surface 60S. In this configuration, clutch oil moving along the center-side slipper cam surface 60S can be efficiently discharged to the outside of the clutch center 40.

In the clutch device 10 according to this preferred embodiment, the clutch center 40 includes the plurality of oil flow holes 49 located farther ahead in the first circumferential direction S1 as advancing in the first direction D1. In this configuration, clutch oil moving along the center-side slipper cam surface 60S can be efficiently discharged to the outside of the clutch center 40.

In the clutch device 10 according to this preferred embodiment, the oil flow holes 49 are formed in the spline grooves 48A closest to the end 60SD of the center-side slipper cam surface 60S in the first circumferential direction S1 in the first circumferential direction S1. In this configuration, since clutch oil is most easily accumulated near the end 60SD of the center-side slipper cam surface 60S in the first circumferential direction S1, the first oil flow hole 49A formed in the spline grooves 48A near this portion enables clutch oil in the clutch center 40 to be more efficiently discharged to the outside of the clutch center 40.

The foregoing description is directed to the first preferred embodiment of the present disclosure. The first preferred embodiment described above, however, is merely an example, and the present disclosure can be performed in various modes and through various preferred embodiments.

Second Preferred Embodiment

Figure 13:
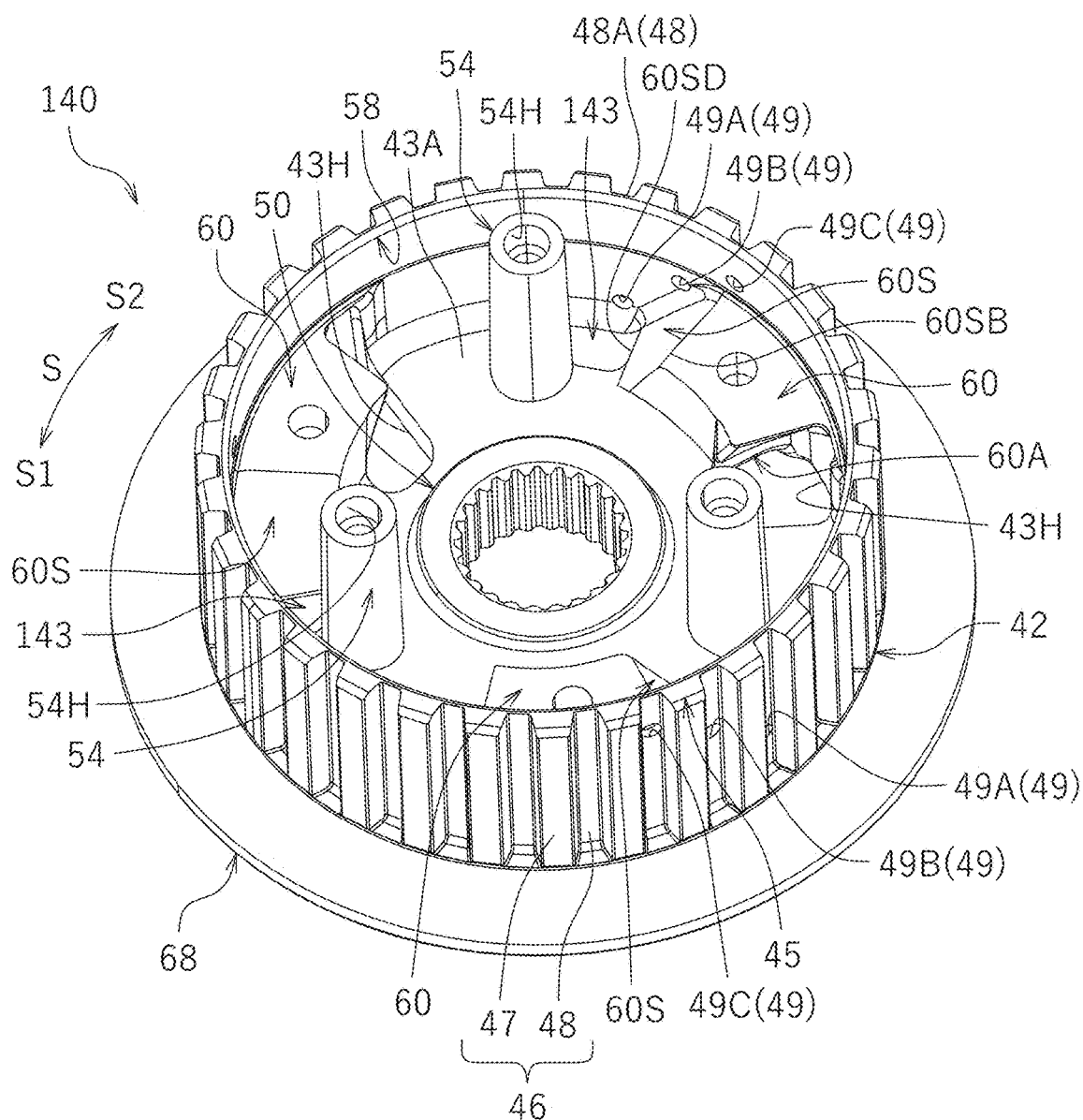
FIG. 13 is a perspective view of a clutch center according to a second preferred embodiment of the present invention.

In the first preferred embodiment described above, the clutch center 40 includes the through hole 43P penetrating the base wall 43 in the directions D. However, the present disclosure is not limited to this preferred embodiment. FIG. 13 is a perspective view of a clutch center 140 according to a second preferred embodiment. As illustrated in FIG. 13, the clutch center 140 includes a recess 143 on a surface 43A of a base wall 43. The recess 143 is recessed from the surface 43A in the first direction D1. The recess 143 is located ahead, in a first direction D1, of an end 60SD of a center-side slipper cam surface 60S in a first circumferential direction S1. The recess 143 is formed between a center-side cam portion 60 and a center-side cam hole 43H. The recess 143 is located ahead, in the first circumferential direction S1, of the end 60SD of the center-side slipper cam surface 60S in the first circumferential direction S1. The recess 143 is located ahead of a boss 54 in a second circumferential direction S2. The recess 143 is located radially outward of the boss 54. The recess 143 is adjacent to the center-side slipper cam surface 60S. The recess 143 is smaller than the center-side cam hole 43H. The recess 143 has the function of holding clutch oil. A first oil flow hole 49A is located radially outward of the recess 143.

In a clutch device 10 according to this preferred embodiment, the clutch center 140 includes a recess 143 located ahead, in the first circumferential direction S1, of the end 60SD of the center-side slipper cam surface 60S in the first circumferential direction S1 and recessed in the first direction D1. In this configuration, since clutch oil is most easily accumulated near the end 60SD of the center-side slipper cam surface 60S in the first circumferential direction S1, the recess 143 disposed near this portion enables a larger amount of clutch oil to be held. Accordingly, clutch oil held in the recess 143 can be efficiently discharged to the outside of the clutch center 40.

In the clutch device 10 according to this preferred embodiment, the first oil flow hole 49A is located radially outward of the recess 143. In this configuration, clutch oil held in the recess 143 can be more efficiently discharged to the outside of the clutch center 40 through the first oil flow hole 49A.

In the preferred embodiment described above, the oil flow holes 49 include the first oil flow hole 49A, the second oil flow hole 49B, and the third oil flow hole 49C, but may include other oil flow holes different from the first through third oil flow holes 49A through 49C. The oil flow holes 49 may include at least one of the first through third oil flow holes 49A through 49C. Alternatively, the oil flow holes 49 may include at least one of the first through third oil flow holes 49A through 49C and other oil flow holes different from the first through third oil flow holes 49A through 49C. The number of the other oil flow holes may be one or two or more.

In the preferred embodiment described above, the plurality of oil flow holes 49 are provided, but some of the oil flow holes 49 may be disposed at locations not recited in independent claims. That is, all the oil flow holes 49 do not need to be disposed at locations recited in the independent claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A clutch device that allows or interrupts transfer of a rotation driving force of an input shaft to an output shaft, the clutch device comprising:
    a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged; and
    a pressure plate movable toward or away from the clutch center and rotatable relative to the clutch center to press the input-side rotating plates and the output-side rotating plates; wherein
    the clutch center includes:
    an output shaft holding portion to which the output shaft is coupled;
    a plurality of center-side cam portions located radially outward of the output shaft holding portion and each including a center-side assist cam surface and a center-side slipper cam surface, the center-side assist cam surface being operable to generate a force in a direction from the pressure plate toward the clutch center in order to increase a pressing force between the input-side rotating plates and the output-side rotating plates upon rotation relative to the pressure plate, the center-side slipper cam surface being operable to cause the pressure plate to move away from the clutch center to reduce the pressing force between the input-side rotating plates and the output-side rotating plates upon rotation relative to the pressure plate;
    a first through hole located between adjacent ones of the center-side cam portions;
    an outer peripheral wall located radially outward of the center-side cam portions;
    a plurality of center-side fitting teeth holding the output-side rotating plates, projecting radially outward from an outer peripheral surface of the outer peripheral wall, and arranged in circumferential directions;
    a plurality of spline grooves each located between adjacent ones of the center-side fitting teeth; and
    an oil flow hole located in the spline grooves to penetrate the outer peripheral wall to allow clutch oil flowing at an inner peripheral side of the outer peripheral wall to be discharged to outside of the clutch center;
    assuming a direction in which the pressure plate approaches the clutch center is a first direction, a direction in which the pressure plate moves away from the clutch center is a second direction, a circumferential direction from one center-side cam portion to another center-side cam portion in the center-side cam portions is a first circumferential direction, and a circumferential direction from the another center-side cam portion to the one center-side cam portion is a second circumferential direction, the clutch center is rotatable in the first circumferential direction that is a direction from the center-side assist cam surface to the center-side slipper cam surface of one of the center-side cam portions, and includes a second through hole located ahead, in the first circumferential direction, of an end of the center-side slipper cam surface in the first circumferential direction;
    in the circumferential directions, the oil flow hole is located between an end of the center-side slipper cam surface in the second circumferential direction and the first through hole located ahead, in the first circumferential direction, of the end in the second circumferential direction; and
    the second through hole is operable to guide clutch oil flowing outside the clutch center to inside of the clutch center.

2. The clutch device according to claim 1, wherein in the circumferential directions, the oil flow hole is located between the end of the center-side slipper cam surface in the first circumferential direction and the first through hole located ahead, in the first circumferential direction, of the end in the first circumferential direction.

3. The clutch device according to claim 2, wherein
    the clutch center includes a boss located radially outward of the output shaft holding portion and extending toward the pressure plate; and
    in the circumferential directions, the oil flow hole is located between the end of the center-side slipper cam surface in the first circumferential direction and the boss located ahead, in the first circumferential direction, of the end in the first circumferential direction.

4. A clutch device that allows or interrupts transfer of a rotation driving force of an input shaft to an output shaft, the clutch device comprising:
    a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged; and a pressure plate movable toward or away from the clutch center and rotatable relative to the clutch center to press the input-side rotating plates and the output-side rotating plates; wherein the clutch center includes:

an output shaft holding portion to which the output shaft is coupled;

a plurality of center-side cam portions located radially outward of the output shaft holding portion and each including a center-side assist cam surface and a center-side slipper cam surface, the center-side assist cam surface being operable to generate a force in a direction from the pressure plate toward the clutch center in order to increase a pressing force between the input-side rotating plates and the output-side rotating plates upon rotation relative to the pressure plate, the center-side slipper cam surface being operable to cause the pressure plate to move away from the clutch center in order to reduce the pressing force between the input-side rotating plates and the output-side rotating plates upon rotation relative to the pressure plate;

a first through hole located between adjacent ones of the center-side cam portions;

an outer peripheral wall located radially outward of the center-side cam portions;

a plurality of center-side fitting teeth holding the output-side rotating plates, projecting radially outward from an outer peripheral surface of the outer peripheral wall, and arranged in circumferential directions;

a plurality of spline grooves each located between adjacent ones of the center-side fitting teeth; and an oil flow hole located in the spline grooves to penetrate the outer peripheral wall to allow clutch oil flowing at an inner peripheral side of the outer peripheral wall to be discharged to outside of the clutch center;

assuming a direction in which the pressure plate approaches the clutch center is a first direction, a direction in which the pressure plate moves away from the clutch center is a second direction, a circumferential direction from one center-side cam portion to another center-side cam portion in the center-side cam portions is a first circumferential direction, and a circumferential direction from the another center-side cam portion to the one center-side cam portion is a second circumferential direction;

the clutch center is rotatable in the first circumferential direction that is a direction from the center-side assist cam surface to the center-side slipper cam surface of one of the center-side cam portions; and the oil flow hole is located between an end of the one center-side cam portion in the first circumferential direction and an end of the one center-side cam portion in the second circumferential direction.

5. The clutch device according to claim 4, wherein the oil flow hole is located between an end of the center-side slipper cam surface in the first circumferential direction and an end of the center-side slipper cam surface in the second circumferential direction.

6. The clutch device according to claim 4, wherein the clutch center includes a plurality of the oil flow holes; and the plurality of the oil flow holes are located along the center-side slipper cam surface.

7. A clutch device that allows or interrupts transfer of a rotation driving force of an input shaft to an output shaft, the clutch device comprising:

a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged; and a pressure plate movable toward or away from the clutch center and rotatable relative to the clutch center to press the input-side rotating plates and the output-side rotating plates; wherein the clutch center includes:

an output shaft holding portion to which the output shaft is coupled;

a plurality of center-side cam portions located radially outward of the output shaft holding portion and each including a center-side assist cam surface and a center-side slipper cam surface, the center-side assist cam surface being operable to generate a force in a direction from the pressure plate toward the clutch center in order to increase a pressing force between the input-side rotating plates and the output-side rotating plates upon rotation relative to the pressure plate, the center-side slipper cam surface being operable to cause the pressure plate to move away from the clutch center in order to reduce the pressing force between the input-side rotating plates and the output-side rotating plates upon rotation relative to the pressure plate;

a first through hole located between adjacent ones of the center-side cam portions;

an outer peripheral wall located radially outward of the center-side cam portions;

a plurality of center-side fitting teeth holding the output-side rotating plates, projecting radially outward from an outer peripheral surface of the outer peripheral wall, and arranged in circumferential directions;

a plurality of spline grooves each located between adjacent ones of the center-side fitting teeth; and an oil flow hole located in the spline grooves to penetrate the outer peripheral wall to allow clutch oil flowing at an inner peripheral side of the outer peripheral wall to be discharged to outside of the clutch center;

assuming a direction in which the pressure plate approaches the clutch center is a first direction, a direction in which the pressure plate moves away from the clutch center is a second direction, a circumferential direction from one center-side cam portion to another center-side cam portion in the center-side cam portions is a first circumferential direction, and a circumferential direction from the another center-side cam portion to the one center-side cam portion is a second circumferential direction, the clutch center is rotatable in the first circumferential direction that is a direction from the center-side assist cam surface to the center-side slipper cam surface of one of the center-side cam portions; and in the circumferential directions, the oil flow hole is located between an end of the center-side slipper cam surface in the second circumferential direction and the first through hole located ahead, in the first circumferential direction, of the end in the second circumferential direction;

the clutch center includes a plurality of the oil flow holes located at different positions in the circumferential directions; and the plurality of the oil flow holes are located farther ahead in the first circumferential direction as advancing in the first direction.

8. The clutch device according to claim 7, wherein the plurality of the oil flow holes are located farther from the center-side slipper cam surface as advancing in the first direction.

9. The clutch device according to claim 7, wherein one of the plurality of the oil flow holes located farthest ahead in the second direction is located in the outer peripheral wall located radially outward of the center-side cam portion.

10. A clutch device that allows or interrupts transfer of a rotation driving force of an input shaft to an output shaft, the clutch device comprising:
  a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged; and
  a pressure plate movable toward or away from the clutch center and rotatable relative to the clutch center to press the input-side rotating plates and the output-side rotating plates; wherein
  the clutch center includes:
  an output shaft holding portion to which the output shaft is coupled,
  a plurality of center-side cam portions located radially outward of the output shaft holding portion and each including a center-side assist cam surface and a center-side slipper cam surface, the center-side assist cam surface being operable to generate a force in a direction from the pressure plate toward the clutch center in order to increase a pressing force between the input-side rotating plates and the output-side rotating plates upon rotation relative to the pressure plate, the center-side slipper cam surface being operable to cause the pressure plate to move away from the clutch center to reduce the pressing force between the input-side rotating plates and the output-side rotating plates upon rotation relative to the pressure plate;
  a first through hole located between adjacent ones of the center-side cam portions;
  an outer peripheral wall located radially outward of the center-side cam portions;
  a plurality of center-side fitting teeth holding the output-side rotating plates, projecting radially outward from an outer peripheral surface of the outer peripheral wall, and arranged in circumferential directions;
  a plurality of spline grooves each located between adjacent ones of the center-side fitting teeth; and
  an oil flow hole located in the spline grooves to penetrate the outer peripheral wall to allow clutch oil flowing at an inner peripheral side of the outer peripheral wall to be discharged to outside of the clutch center;
  assuming a direction in which the pressure plate approaches the clutch center is a first direction, a direction in which the pressure plate moves away from the clutch center is a second direction, a circumferential direction from one center-side cam portion to another center-side cam portion in the center-side cam portions is a first circumferential direction, and a circumferential direction from the another center-side cam portion to the one center-side cam portion is a second circumferential direction;
  the clutch center is rotatable in the first circumferential direction that is a direction from the center-side assist cam surface to the center-side slipper cam surface of one of the center-side cam portions, and includes a recess located ahead, in the first circumferential direction, of an end of the center-side slipper cam surface in the first circumferential direction and recessed in the first direction; and
  in the circumferential directions, the oil flow hole is located between an end of the center-side slipper cam surface in the second circumferential direction and the first through hole located ahead, in the first circumferential direction, of the end in the second circumferential direction.

11. The clutch device according to claim 10, wherein the oil flow holes are located radially outward of the recess.

12. The clutch device according to claim 11, wherein in the circumferential directions, the recess is located between the end of the center-side slipper cam surface in the first circumferential direction and the first through hole.

* * * * *